United States Patent
Roach et al.

(10) Patent No.: US 11,313,499 B2
(45) Date of Patent: Apr. 26, 2022

(54) PIPE FITTING APPARATUS AND METHODS

(71) Applicant: IPS, CORPORATION - WELD-ON DIVISION, Compton, CA (US)

(72) Inventors: Jack Roach, Durham, NC (US); Fabio Castellani, Long Beach, CA (US)

(73) Assignee: IPS, CORPORATION - WELD-ON DIVISION, Compton, CA (US)

( * ) Notice: Subject to any disclaimer, the term of this patent is extended or adjusted under 35 U.S.C. 154(b) by 480 days.

(21) Appl. No.: 16/482,674

(22) PCT Filed: Mar. 10, 2018

(86) PCT No.: PCT/US2018/021889
§ 371 (c)(1),
(2) Date: Jul. 31, 2019

(87) PCT Pub. No.: WO2018/182953
PCT Pub. Date: Oct. 4, 2018

(65) Prior Publication Data
US 2020/0011460 A1 Jan. 9, 2020

Related U.S. Application Data

(60) Provisional application No. 62/478,812, filed on Mar. 30, 2017.

(51) Int. Cl.
*F16L 21/06* (2006.01)
*F16L 23/036* (2006.01)
(Continued)

(52) U.S. Cl.
CPC .............. *F16L 23/036* (2013.01); *F16L 21/03* (2013.01); *F16L 21/08* (2013.01); *F16L 37/105* (2013.01)

(58) Field of Classification Search
CPC ......... F16L 13/00; F16L 13/10; F16L 13/103; F16L 13/11; F16L 21/02; F16L 21/03;
(Continued)

(56) References Cited

U.S. PATENT DOCUMENTS 2,747,898 A 5/1956 Wiltse
3,193,311 A * 7/1965 Gordan ................ F16L 17/067
285/70

(Continued)

OTHER PUBLICATIONS

International Search Report and Written Opinion of the International Searching Authority, International Application No. PCT/US2018/021889, dated Jun. 11, 2018, 10 pp.

(Continued)

*Primary Examiner* — Aaron M Dunwoody
(74) *Attorney, Agent, or Firm* — Myers Bigel, P.A.

(57) ABSTRACT

A pipe fitting includes a socket that receives an end of a pipe section therein such that a gap exists between an outer surface of the pipe section and an inner surface of the socket. A pair of ports extend through the socket and are in fluid communication with the gap. A clamp secures the pipe section within the socket as a bonding agent is extruded into the gap via a port. The clamp includes a pair of arcuate segments, each having an inner circumferential wall, first and second end portions, and an elongated sealing member. Each arcuate segment includes a plurality of spring-loaded devices, each having a distal end portion extending through the inner circumferential wall that is urged into contact with the pipe section outer surface.

19 Claims, 28 Drawing Sheets

(51) Int. Cl.
*F16L 21/03* (2006.01)
*F16L 21/08* (2006.01)
*F16L 37/10* (2006.01)

(58) Field of Classification Search
CPC . F16L 21/06; F16L 21/08; F16L 23/04; F16L 23/08; F16L 23/10; F16L 37/105; F16L 37/10; F16L 37/101
USPC ....... 285/915, 403, 404, 405, 406, 414, 415, 285/374, 420
See application file for complete search history.

(56) References Cited

U.S. PATENT DOCUMENTS

| | | | | |
|---|---|---|---|---|
| 3,747,946 | A * | 7/1973 | Edens | B23B 31/117 |
| | | | | 279/81 |
| 4,226,444 | A * | 10/1980 | Bunyan | F16L 13/11 |
| | | | | 285/21.1 |
| 4,563,116 | A * | 1/1986 | Edens | B23B 31/113 |
| | | | | 279/20 |
| 4,606,557 | A * | 8/1986 | Coffey | E21B 33/038 |
| | | | | 285/18 |
| 4,822,203 | A | 4/1989 | Walmsley | |
| 5,697,135 | A | 12/1997 | Dischler | |
| 7,341,285 | B2 * | 3/2008 | McPherson | B29C 66/342 |
| | | | | 285/286.1 |
| 10,570,896 | B1 * | 2/2020 | Guerra | F04B 53/16 |
| 2003/0047946 | A1 * | 3/2003 | Ohanesian | F16L 25/08 |
| | | | | 285/404 |
| 2013/0181436 | A1 | 7/2013 | McPherson et al. | |
| 2013/0285372 | A1 * | 10/2013 | Lecointe | F16L 13/11 |
| | | | | 285/294.3 |
| 2015/0233498 | A1 * | 8/2015 | Olson | F16L 13/11 |
| | | | | 285/285.1 |
| 2016/0091131 | A1 * | 3/2016 | Roach | F16L 37/10 |
| | | | | 285/285.1 |
| 2018/0058614 | A1 * | 3/2018 | Anderson | F16L 21/06 |
| 2019/0078397 | A1 * | 3/2019 | Nguyen | E21B 33/038 |
| 2019/0249387 | A1 * | 8/2019 | Horie | F16L 21/02 |
| 2019/0308047 | A1 * | 10/2019 | Hofmann | F16L 21/03 |
| 2019/0389105 | A1 * | 12/2019 | Nomizo | F16L 13/007 |
| 2020/0292111 | A1 * | 9/2020 | Felberg | A62C 35/68 |

OTHER PUBLICATIONS

Communication with Supplementary European Search Report, EP Application No. 18777632.3, dated Jan. 2, 2020, 9 pp.

* cited by examiner

PIPE FITTING APPARATUS AND METHODS

RELATED APPLICATION

This application is a 35 U.S.C. § 371 national stage application of PCT Application No. PCT/US2018/021889, filed on Mar. 10, 2018, which itself claims the benefit of and priority to U.S. Provisional Patent Application No. 62/478,812 filed Mar. 30, 2017, the disclosures of both of which are incorporated herein by reference as if set forth their entireties. The above-referenced PCT International Application was published in the English language as International Publication No. WO 2018/182953 A1 on Oct. 4, 2018.

FIELD OF THE INVENTION

The present invention relates generally to pipes and fittings, more particularly, to joining pipes and fittings.

BACKGROUND OF THE INVENTION

The vast majority of connections of piping components (pipe, valves, fittings, etc.) require the connection to be permanent and not something that can be disassembled like a threaded or flanged connection (i.e. mechanical joint). Depending on the piping system materials, permanent jointing methods such as solvent cementing, heat fusion, welding and fiberglass hand layup have been utilized. However, each one of these methods presents challenges varying from VOC emissions to the need for power tools and all heavily rely on skilled labor for the success of the union.

More recently adhesive products (bonding agents) have been developed for joining thermoplastic, thermoset, and metallic pipe and fittings for a multitude of applications (both pressure and non-pressure). Though bonding agents have been in use for decades, they typically have not been strong enough to handle the harsh environments of some piping installations. Newer adhesives can and do stand-up to the harshest of pressure and non-pressure piping environments. These new bonding agents can be applied via brush application or via injection. In a brush application, the bonding agent is applied to the pipe end and/or fitting socket with a brush prior to assembly. The brush method may require that special attention be paid to assembly techniques in order to avoid depositing into the piping water-way excess bonding agent or having excess adhesive drip from the socket entrance. The brush method may also require special attention to pipe and fitting tolerances as well as pipe and fitting out of roundness.

Prior injection application methods may involve cumbersome clamps and sealing devices that are installed prior to injecting a bonding agent. These cumbersome clamps and sealing devices incorporate some form of secondary additional seal at the socket bottom to prevent leakage of the bonding agent during the injection process.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a pipe fitting includes a tubular member comprising a socket and a centering device within the socket. The pipe fitting can be shaped as a straight union, an elbow, a "T", a "Y", a cross or any other desired geometry. The socket is configured to receive an end of a pipe section therein such that a uniform gap exists between an outer surface of the pipe section and an inner surface of the socket. An annular pipe stop extends from the inner surface of the socket and is configured to matingly engage with the end of the pipe section. In some embodiments, the annular pipe stop has a radial length that is equal to or greater than a wall thickness of the pipe section, which can improve the hoop strength of the pipe fitting.

A pair of ports (one for bonding agent injection and the other for exhaust) extend through the tubular member in circumferentially spaced-apart relationship (e.g., diametrically opposed, etc.) and are in fluid communication with the gap. The centering device may help maintain a coaxial relationship between the pipe section and the socket and such that the gap is substantially circumferentially uniform and such that a bonding agent injected therein is substantially circumferentially uniform.

In some embodiments the centering device is a grab ring that is positioned within the socket prior to insertion of the pipe section. The grab ring includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. Typically, adjacent ones of the first plurality of gripping teeth are spaced-apart between about one-quarter inch and about one inch (0.25"-1.0"), and adjacent ones of the second plurality of gripping teeth are spaced-apart between about one-quarter inch and about one inch (0.25"-1.0"). However, other distances between adjacent gripping teeth (both the first plurality and the second plurality) may be utilized.

The annular member may have a frusto-conical configuration in some embodiments. In other embodiments, the annular member is substantially planar.

In some embodiments, each of the first and second plurality of gripping teeth have a generally triangular shape; however, other shapes are possible.

In some embodiments, the first plurality of gripping teeth are larger than the second plurality of gripping teeth. In other embodiments, the first and second plurality of gripping teeth have substantially the same size.

In some embodiments, a distance that each of the first plurality of gripping teeth project inwardly from the inner peripheral edge is greater than a distance that each of the second plurality of gripping teeth project outwardly from the outer peripheral edge.

In some embodiments, the first plurality of gripping teeth are staggered relative to the second plurality of gripping teeth. In other embodiments, each one of the first plurality of gripping teeth are substantially adjacent to a respective one of the second plurality of gripping teeth.

In some embodiments the centering device comprises a plurality of raised members or bumps extending outwardly from the inner surface of the socket in circumferentially spaced-apart relationship. For example, in some embodiments, the raised members are substantially equidistantly spaced-apart (i.e., spaced-apart 120°).

The pipe fitting also includes a removable and reusable clamp that secures the pipe section within the socket as a bonding agent is extruded into the gap via one of the ports. The clamp includes a plurality of arcuate segments, each arcuate segment having a sealing member attached thereto.

In some embodiments, the sealing member of each arcuate segment is removably secured to the arcuate segment first member. As such, the sealing members can be replaced if worn or damaged.

In some embodiments, a length of each sealing member is greater than a length of the respective arcuate segment to which the sealing member is attached. This causes the ends of adjacent sealing members to contact each other and form an annular seal that surrounds the pipe section.

The clamp also includes a tightening mechanism that is configured to radially compress the clamp such that the arcuate segments and their sealing members move radially inward such that the sealing members are compressed into sealing engagement with the tubular member and pipe section to seal an open end of the gap. When a bonding agent is injected into the gap via a port, the sealing members prevent the bonding agent from leaking out of the open end of the socket. The clamp also serves an additional function, which is to draw the pipe downward tight against the socket bottom, thus creating a positive seal between the pipe edge and fitting pipe-stop at the bottom of the socket without the need for an additional secondary seal. Once the bonding agent has been injected, the clamp is removed. The clamp can then be reused.

In some embodiments, the tubular member includes an annular flange having a sloped outer wall. Each arcuate segment of the clamp includes first and second members that are matingly engaged and that are also secured together via at least one fastener. Each first member includes an arcuate groove configured to receive a portion of the tubular member annular flange. The arcuate groove in each first member also includes a sloped inner wall that engages the annular flange sloped outer wall. The sloped inner walls and the annular flange sloped outer wall move relative to each other as the first members are moved radially inwardly via the clamp tightening mechanism and such that the clamp first members move in an axial direction towards the tubular member. In some embodiments, the second member of each clamp segment includes teeth configured to engage the pipe section.

According to some embodiments of the present invention, a method of forming a pipe joint between a pipe section and a pipe fitting includes inserting an end of the pipe section into a socket of the pipe fitting, and attaching a removable clamp to the pipe section and pipe fitting. The pipe fitting can be shaped as a straight union, an elbow, a "T", a "Y", a cross or any other desired geometry. The socket includes a centering device and a pipe stop that is configured to receive the end of the pipe section. Prior to insertion within the socket, material may be removed from the pipe end to create a profiled end that matingly engages with the pipe stop either by conical alignment or by a snap-fit from the pipe outer diameter being slightly larger in diameter than the pipe stop inner diameter. In conjunction with the clamp, either embodiment of the pipe profiled end (conical or snap-fit) creates a uniform interstitial space and a positive plastic to plastic seal at the pipe stop. Further to removal of material to create the pipe profiled end, additional material may be removed from the pipe outer diameter to a distance slightly greater than the depth of the fitting socket to ensure removal of any out of roundness so that a uniform gap exists between an outer surface of the pipe section and an inner surface of the socket.

The clamp includes a plurality of arcuate segments and a tightening mechanism, and each arcuate segment has a removable/replaceable sealing member. The method further includes radially compressing the arcuate segments via the tightening mechanism to cause the respective sealing members to seal an open end of the gap. The clamp also serves an additional function, which is to draw the pipe downward tight against the socket bottom, thus creating a positive seal between the pipe edge and fitting pipe-stop at the bottom of the socket without the need for an additional secondary seal. A bonding agent is then injected into the gap via a port that extends through the pipe fitting. Once the bonding agent has been injected, the clamp is removed. The clamp can then be reused.

The centering device may help maintain a coaxial relationship between the pipe section and the socket and such that a substantially circumferentially uniform gap exists between an outer surface of the pipe section and an inner surface of the socket. In some embodiments, the centering device is a grab ring that includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. Inserting the end of the pipe section into the socket includes inserting the end of the pipe section through the grab ring such that the first plurality of gripping teeth engage the outer surface of the pipe section.

In other embodiments, the centering device includes a plurality of raised members or bumps extending outwardly from the inner surface of the socket in circumferentially spaced-apart relationship. Inserting the end of the pipe section into the socket includes inserting the end of the pipe section into the socket such that the plurality of raised members engage the outer surface of the pipe section.

According to some embodiments of the present invention, a reinforcement band, such as a metallic band, is positioned around the tubular member. The reinforcement band increases the hoop strength of the pipe fitting. In some embodiments, the reinforcement band includes a pair of openings formed therein, each opening associated with a respective one of the pair of adhesive injection ports in the pipe fitting.

According to some embodiments of the present invention, the pipe fitting tubular member includes glass fiber reinforcement (GFR) material, which can increase the hoop strength of the pipe fitting.

The use of a reinforcement band or GFR material reduces hoop stress in the wall of the socket of a pipe fitting and improves the dimensional stability of the pipe fitting, particularly in high pressure/temperature applications. As such, the use of GFR material in a pipe fitting and the use of a reinforcement band provides additional flexibility to a piping system designer when selecting a cost effective solution to the pressure requirements of a given piping system.

According to other embodiments of the present invention, a pipe connector kit includes a tubular member having a socket configured to receive an end of a pipe section therein, a centering device within the socket that may help maintain a coaxial relationship between the pipe section and the socket and such that a gap between an outer surface of the pipe section and an inner surface of the socket is substantially circumferentially uniform, and a removable clamp that secures the pipe section within the socket as a bonding agent is extruded into the gap via a port in the tubular member. The kit may also include a container of a bonding agent that is configured to inject the bonding agent into the gap via the port.

The clamp includes a plurality of arcuate segments, each having a respective sealing member. The clamp also includes a tightening mechanism that is configured to radially compress the clamp such that the sealing members are compressed into sealing engagement with the tubular member and pipe section to seal an open end of the gap. When a bonding agent is injected into the gap via a port, the sealing members prevent the bonding agent from leaking out of the open end of the socket. The clamp also serves an additional function, which is to draw the pipe downward tight against the socket bottom, thus creating a positive seal between the pipe edge and fitting pipe-stop at the bottom of the socket without the need for an additional secondary seal. Once the bonding agent has been injected, the clamp is removed. The clamp can then be reused.

The tubular member includes an annular flange having a sloped outer wall, and each arcuate segment of the clamp includes first and second members secured together. Each first member includes an arcuate groove that is configured to receive a portion of the tubular member annular flange. The arcuate groove in each first member includes a sloped inner wall that engages the annular flange sloped outer wall. The sloped inner walls of the arcuate segments and the annular flange sloped outer wall move relative to each other as the first members are radially moved inwardly via the tightening mechanism and such that the clamp first members move in an axial direction towards the tubular member.

In some embodiments, the centering device is a grab ring that includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. In other embodiments, the centering device comprises a plurality of raised members or bumps extending outwardly from the inner surface of the socket in circumferentially spaced-apart relationship.

Embodiments of the present invention provide an injection socket and clamp with an elegant design that guarantees alignment of a pipe into the fitting socket, thus creating interstitial space necessary for the successful bonding of the parts, that greatly simplifies the joining process itself requiring little or no skills to perform the few simple steps of the process, and that eliminates the need for a secondary additional seal for sealing the socket bottom to prevent leakage of the bonding agent during the injection process. Embodiments of the present invention accomplish this by forcing a pipe end tight against the socket bottom via the clamp and ramp design described herein. Moreover, embodiments of the present invention are more efficient (less waste) than brush methods and provide for full and complete filling of a well-defined interstitial space between a pipe and fitting socket. In addition, clamps, according to embodiments of the present invention can be reusable.

According to other embodiments of the present invention, a clamp that facilitates securing a pipe section within a socket includes a pair of arcuate segments, each arcuate segment having opposite outer and inner circumferential walls, opposite first and second end portions, and an elongated sealing member extending outwardly from the inner circumferential wall along an entire length of the inner circumferential wall. In addition, each arcuate segment includes a plurality of circumferentially spaced-apart spring-loaded devices, each spring-loaded device having a distal end portion or tip extending radially inwardly through the inner circumferential wall that is configured to be urged into contact with an outer surface of the pipe section.

The arcuate segments are hinged together at the respective first ends thereof and are removably fastened together at the respective second ends thereof by a fastener. The fastener is configured to draw the second ends of the arcuate segments toward each other such that the sealing members are compressed into sealing engagement with the socket and the outer surface of the pipe section. The plurality of spring loaded devices serve to hold the pipe downward and tight against the socket bottom, keeping the pipe inserted past the pipe stop and thus helping in creating a positive seal between the pipe edge and fitting pipe-stop at the bottom of the socket without the need for an additional secondary seal at this location to prevent leakage of a bonding agent during injection of the bonding agent. In addition, the spring loaded devices may also help maintain a coaxial relationship between the pipe section and the socket.

The socket includes an annular flange having a sloped outer wall, and each arcuate segment includes an arcuate groove configured to receive a portion of the socket annular flange. The arcuate groove includes a sloped inner wall that engages the annular flange sloped outer wall. The sloped inner walls of the arcuate segments and the annular flange sloped outer wall move relative to each other as the second ends of the arcuate segments are drawn together by the fastener.

In some embodiments, the length of each sealing member is greater than the length of the inner circumferential wall of a respective arcuate segment. This causes the ends of the two sealing members to contact each other and form an annular seal that surrounds the pipe section. In some embodiments, each sealing member is removably secured to a respective arcuate segment, for example via a slot or groove in each arcuate segment.

In some embodiments, each arcuate segment includes a plurality of circumferentially spaced apart bores extending therethrough from the outer circumferential wall to the inner circumferential wall. At least a portion of each bore is threaded, and each spring-loaded device includes a threaded body that is threadingly secured within a respective bore. Each spring-loaded device includes a spring within the threaded body that urges the distal end portion into contact with the outer surface of the pipe section.

According to some embodiments of the present invention, a pipe connector kit includes a tubular member comprising a socket configured to receive an end of a pipe section therein such that a gap exists between an outer surface of the pipe section and an inner surface of the socket, a clamp, and a container of bonding agent. A pair of ports extend through the tubular member in circumferentially spaced-apart relationship and are in fluid communication with the gap. The clamp secures the pipe section within the socket as the bonding agent is extruded into the gap via one of the ports. The container is configured to inject the bonding agent into the gap via one of the ports.

The clamp includes a pair of arcuate segments, and each arcuate segment includes opposite outer an inner circumferential walls, opposite first and second end portions, and an elongated sealing member extending outwardly from the inner circumferential wall along an entire length of the inner circumferential wall. In addition, each arcuate segment includes a plurality of circumferentially spaced-apart spring-loaded devices, each spring-loaded device having a distal end portion or tip extending radially inwardly through the inner circumferential wall that is configured to be urged into contact with an outer surface of the pipe section. The arcuate segments are hinged together at the respective first ends thereof and are removably fastened together at the respective second ends thereof by a fastener. The fastener is configured to draw the second ends of the arcuate segments toward each other such that the sealing members are compressed into sealing engagement with the socket and the outer surface of the pipe section.

The plurality of spring loaded devices serve to hold the pipe downward and tight against the socket bottom, keeping the pipe inserted past the pipe stop and thus helping in creating a positive seal between the pipe edge and fitting pipe-stop at the bottom of the socket without the need for an additional secondary seal at this location to prevent leakage of a bonding agent during injection of the bonding agent. In addition, the spring loaded devices may also help maintain a coaxial relationship between the pipe section and the socket.

In some embodiments, the tubular member includes an annular flange having a sloped outer wall, and each arcuate segment includes an arcuate groove configured to receive a portion of the socket annular flange. The arcuate groove of each arcuate segment includes a sloped inner wall that engages the annular flange sloped outer wall. The sloped inner walls of the arcuate segments and the annular flange sloped outer wall move relative to each other as the second ends of the arcuate segments are drawn together by the fastener.

In some embodiments, the length of each sealing member is greater than the length of the inner circumferential wall of a respective arcuate segment. This causes the ends of the two sealing members to contact each other and form an annular seal that surrounds the pipe section. In some embodiments, each sealing member is removably secured to a respective arcuate segment, for example via a slot or groove formed in each arcuate segment.

In some embodiments, each arcuate segment includes a plurality of circumferentially spaced apart bores extending therethrough from the outer circumferential wall to the inner circumferential wall. At least a portion of each bore is threaded, and each spring-loaded device includes a threaded body that is threadingly secured within a respective bore. Each spring-loaded device includes a spring within the threaded body that urges the distal end portion into contact with the outer surface of the pipe section.

According to some embodiments of the present invention, a centering device is included within the socket that may help maintain a coaxial relationship between the pipe section and the socket. The centering device may be a grab ring having an annular member with opposite inner and outer peripheral edges. A first plurality of inwardly projecting gripping teeth are on the inner peripheral edge in circumferentially spaced-apart relationship, and a second plurality of outwardly projecting gripping teeth are on the outer peripheral edge in circumferentially spaced-apart relationship. In other embodiments, the centering device includes a plurality of raised members extending outwardly from the inner surface of the socket in circumferentially spaced-apart relationship.

According to other embodiments of the present invention, a method of forming a pipe joint between a pipe section and a pipe fitting, includes inserting an end of the pipe section into a socket of the pipe fitting, and attaching a clamp to the pipe section and pipe fitting. The clamp includes a pair of arcuate segments, and each arcuate segment has an inner circumferential wall, opposite first and second end portions, and an elongated sealing member extending outwardly from the inner circumferential wall along an entire length of the inner circumferential wall. The arcuate segments are hinged together at the respective first ends thereof and are removably fastened together at the respective second ends thereof by a fastener. Each arcuate segment also has a plurality of circumferentially spaced-apart spring-loaded devices, each spring-loaded device having a distal end portion extending through the inner circumferential wall that is configured to be urged into contact with an outer surface of the pipe section.

The method includes drawing the respective second ends of the arcuate segments together via the fastener such that the sealing members are compressed into sealing engagement with the socket and the outer surface of the pipe section. The plurality of spring loaded devices serve to hold the pipe downward and tight against the socket bottom, keeping the pipe inserted past the pipe stop and thus helping in creating a positive seal between the pipe edge and fitting pipe-stop at the bottom of the socket without the need for an additional secondary seal at this location to prevent leakage of a bonding agent during injection of the bonding agent (i.e., an adhesive) into the gap via a port that extends through the pipe fitting.

The socket includes an annular pipe stop extending from the inner surface thereof that is configured to receive the end of the pipe section, and the method may include, prior to inserting the end of the pipe section into the socket, removing material from the pipe end to create a profiled end that matingly engages with the pipe stop. In addition to removal of material to create the pipe profiled end, additional material is removed from the pipe outer diameter to a distance slightly greater than the depth of the fitting socket to ensure removal of any out of roundness so that a uniform gap exists between an outer surface of the pipe section and an inner surface of the socket. Inserting the end of the pipe section into the socket then includes engaging the profiled end of the pipe section with the pipe stop.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

In FIG. 1, a portion of a male end of a pipe section is inserted into the socket and is being held in place via the clamp so that a bonding agent can be injected into a gap between the pipe section and the socket to join the pipe section to the pipe fitting.

In FIGS. 18 and 19, a portion of a male end of the pipe section is inserted into the socket and is being held in place via the clamp so that a bonding agent can be injected into a gap between the pipe section and the socket to join the pipe section to the pipe fitting.

DETAILED DESCRIPTION OF THE INVENTION

Figure 1:
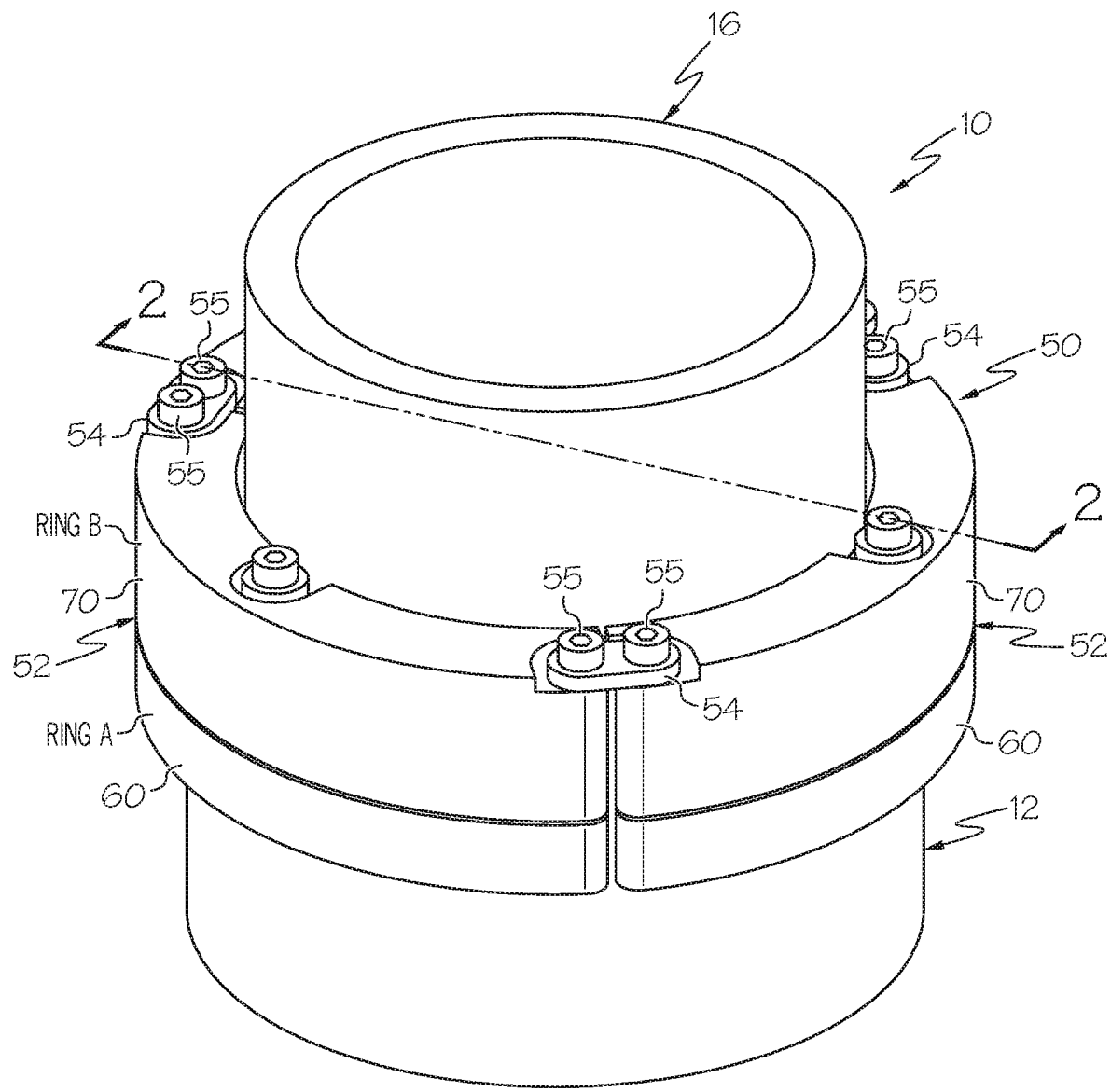
FIG. 1 is a perspective view of a pipe fitting that includes a tubular member having a socket, a centering device within the socket, and a removable clamp, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/− twenty percent (20%).

The term "frusto-conical", as used herein, means having the shape of a cone with the narrow end, or tip, removed.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Figure 2:
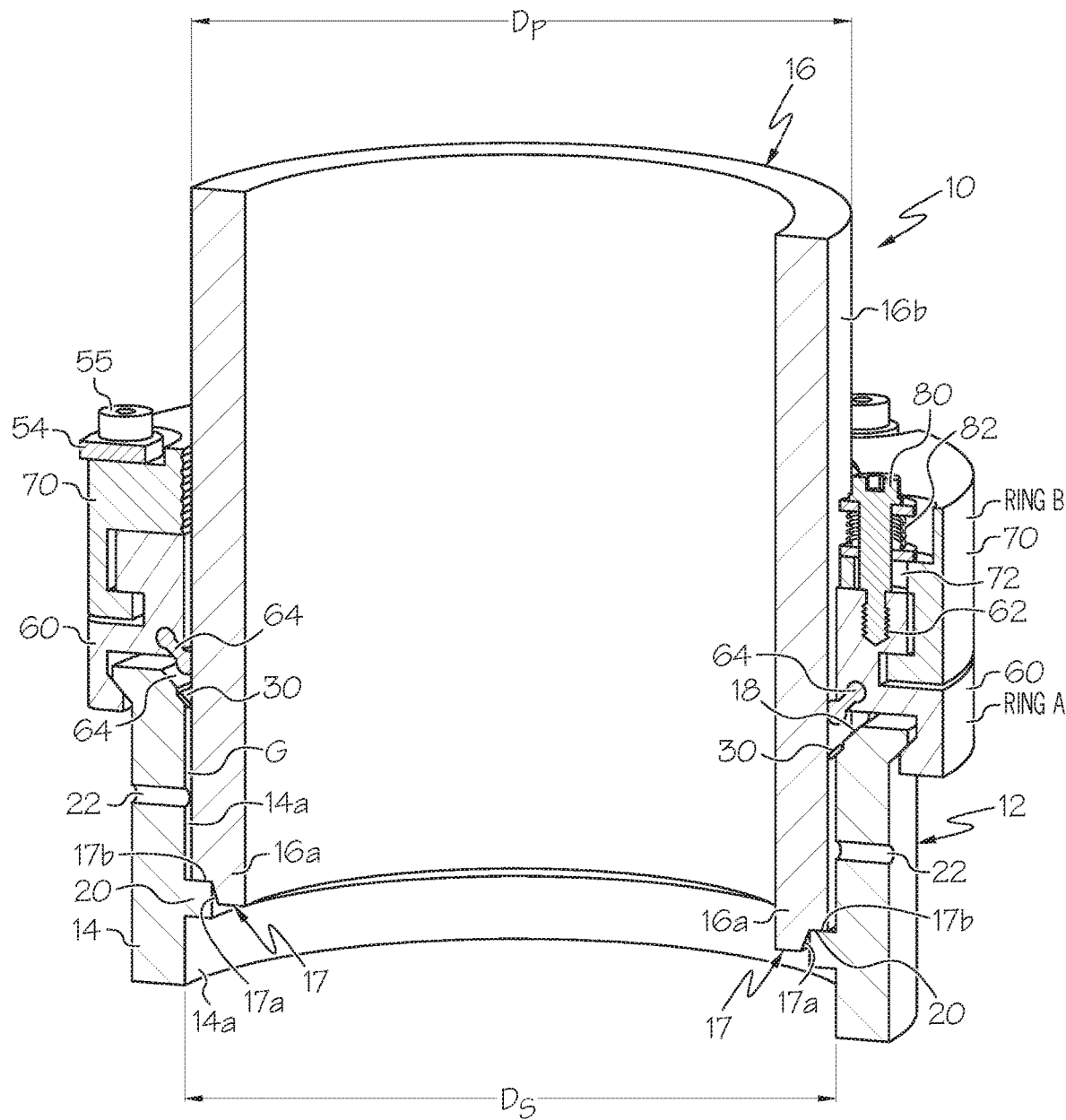
FIG. 2 is a cross-sectional view of the pipe fitting of FIG. 1 taken along lines 2-2 and illustrating a grab ring, according to some embodiments of the present invention.
Figure 3:
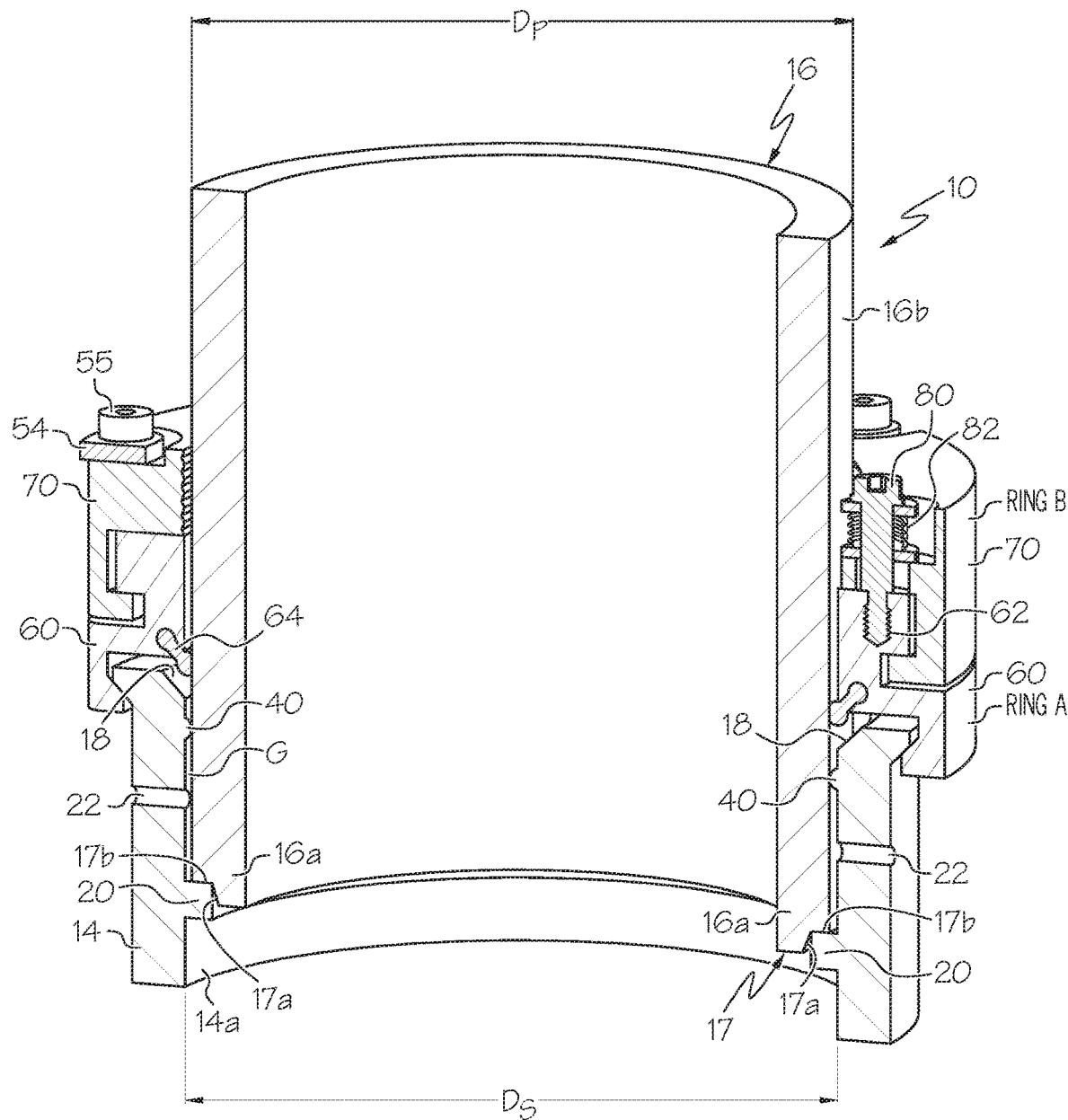
FIG. 3 is a cross-sectional view of the pipe fitting of FIG. 1 taken along lines 2-2 and illustrating circumferentially spaced-apart raised members extending outwardly from the inner surface of the socket, according to some embodiments of the present invention.

Referring now to FIGS. 1-3, a pipe fitting 10, according to some embodiments of the present invention, is illustrated. The pipe fitting 10 includes a tubular member 12 having a socket 14 configured to receive an end 16a of a pipe section 16 therein. The pipe fitting 10 can be shaped as a straight union, an elbow, a "T", a "Y", a cross or any other desired geometry. The socket 14 has an internal diameter Ds that is larger than the outer diameter Dp of the pipe section such that a gap G exists between an outer surface of the pipe section 16 and an inner surface 14a of the socket 14 when the pipe section 16 is centered within the socket 14. The socket 14 includes an open free end 18 through which the end 16a of the pipe section 16 is inserted and a pipe stop 20 that is configured to matingly engage with the end 16a of the pipe section. In the illustrated embodiment, the pipe stop 20 is an annular member that extends from the inner surface 14a of the socket 14. In some embodiments of the present invention, prior to insertion within the socket, material is removed from the pipe end 16a (e.g., via a hand tool or lathe, etc.) to create a profiled end 17 that matingly engages with the pipe stop 20.

As illustrated in FIG. 2, the profiled end 17 includes a tapered portion 17a and an engagement portion 17b. The tapered portion 17a is inserted into the opening of the annular pipe stop 20 and the engagement portion 17b is configured to abut against the pipe stop 20 in face-to-face relationship. The profiled end 17 acts as a locating pin at the pipe stop 20 and facilitates insertion of the pipe end 16a fully within the socket 14. The tapered portion 17a of the pipe end 16a is angled such that when the pipe section 16 is fully bottomed against the pipe stop 20, the pipe section 16 cannot move side to side (radially) in any direction.

Figure 34:
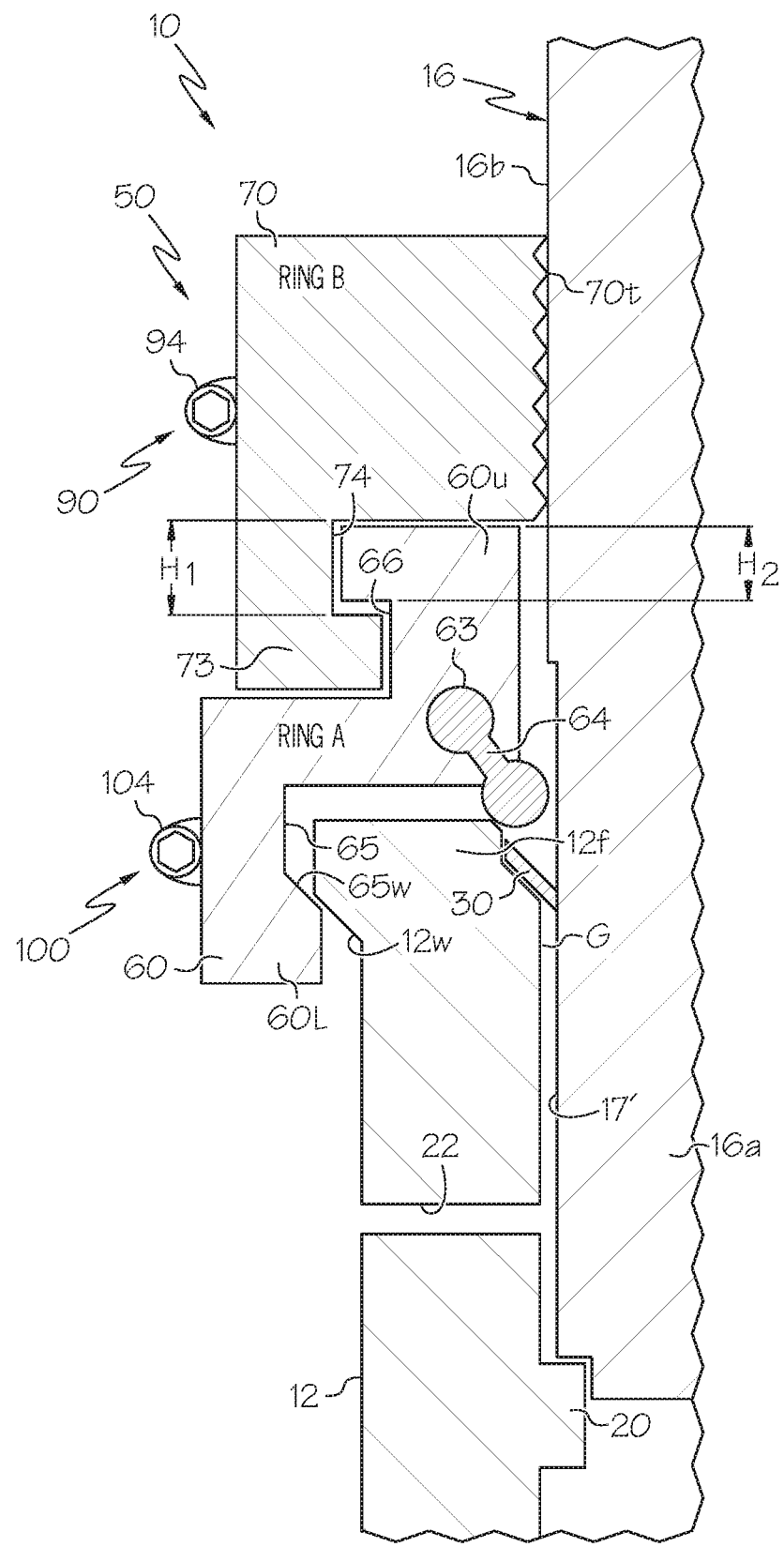
FIG. 34 is a partial view of the pipe fitting of FIG. 2 that illustrates material removed from the end of the pipe section to create a profiled end, according to some embodiments of the present invention.
Figure 35:
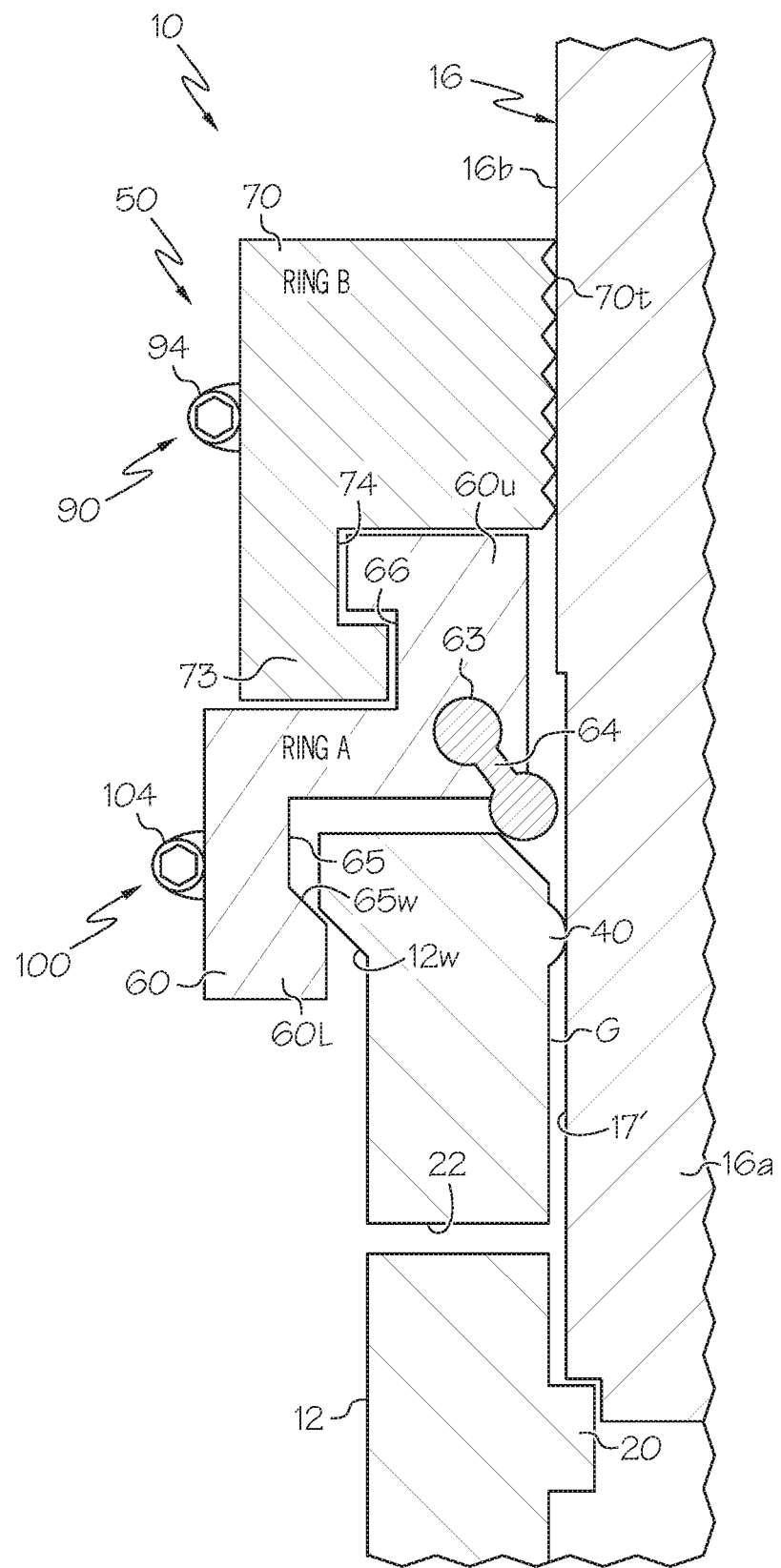
FIG. 35 is a partial view of the pipe fitting of FIG. 3 that illustrates material removed from the end of the pipe section to create a profiled end, according to some embodiments of the present invention.
Figure 36:
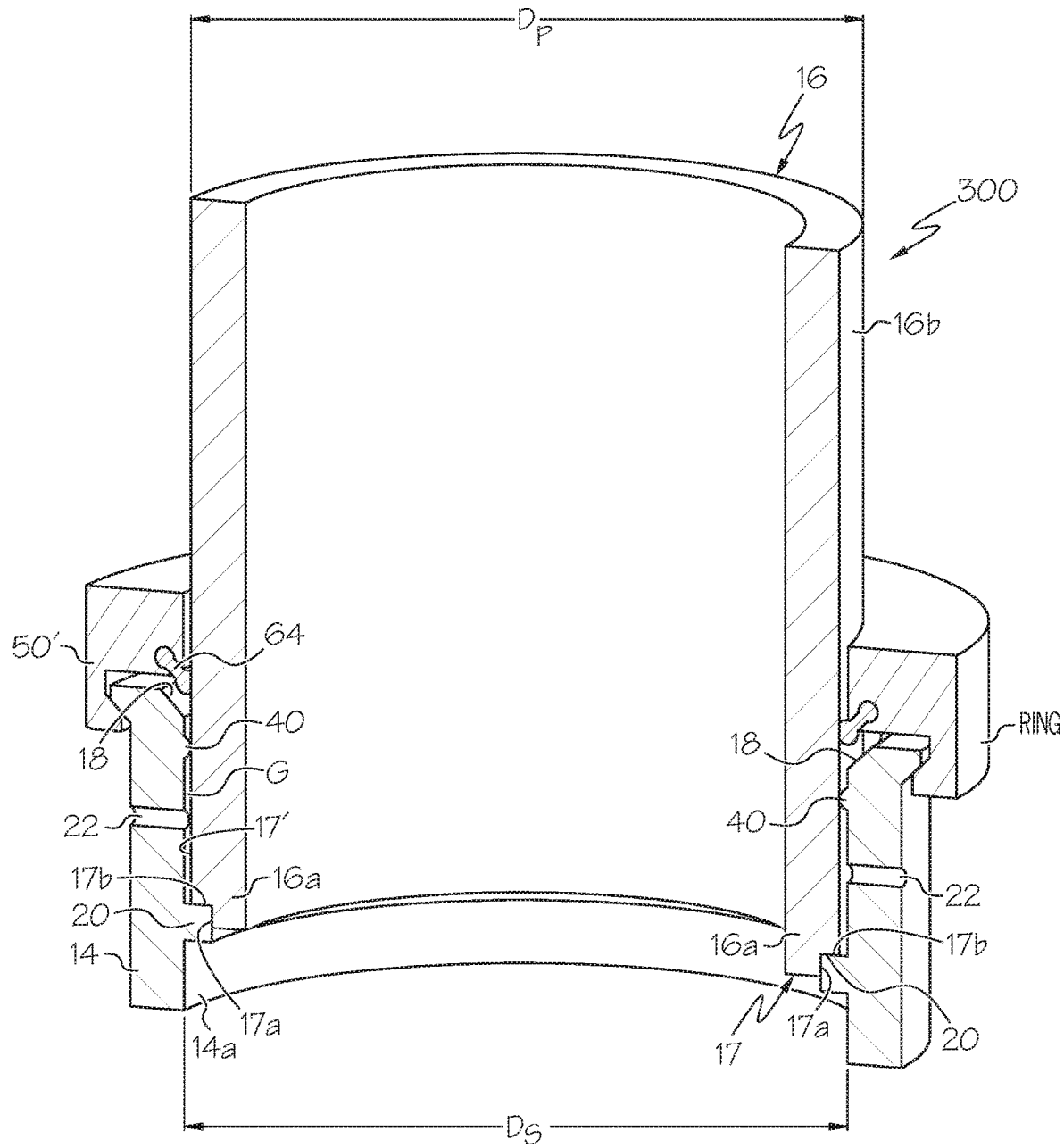
FIG. 36 illustrates the pipe fitting of FIG. 3 with the removable clamp of FIG. 20, and wherein the pipe section has a profiled end, according to some embodiments of the present invention.
Figure 37:
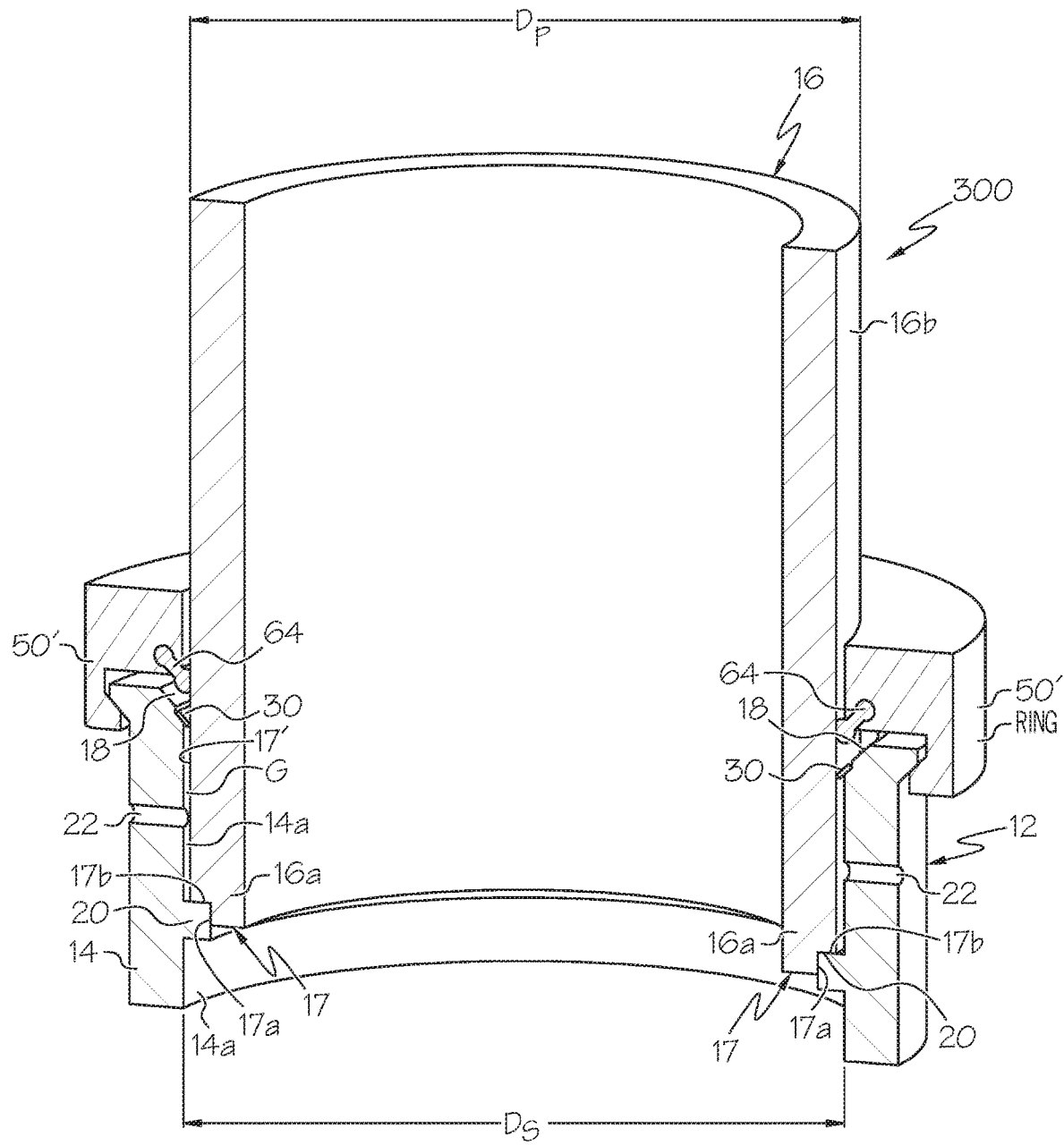
FIG. 37 illustrates the pipe fitting of FIG. 2 with the removable clamp of FIG. 20, and wherein the pipe section has a profiled end, according to some embodiments of the present invention.

As illustrated in FIGS. 34 and 35, material is removed from the pipe end 16a to create a profiled pipe end 17' and pipe-stop 20 are, thus, continuous and uninterrupted around the entire circumference thereof (i.e., any out-of-roundness is removed and a slight interference fit is maintained between the pipe outer diameter Dp and the pipe stop inner diameter Ds. This provides a "snap-fit" between the pipe and the pipe stop, which creates a positive seal of plastic to plastic to prevent leakage of the bonding agent during injection of the bonding agent. Removal of material to create the pipe profiled end may extend to a distance slightly greater than the depth of the fitting socket to ensure removal of any out of roundness and so that a uniform gap exists between an outer surface of the pipe section and an inner surface of the socket.

A pair of ports 22 extend through the tubular member 12 in circumferentially spaced-apart relationship and are in fluid communication with the gap G. In the illustrated embodiment, the ports 22 are diametrically opposed. A bonding agent is injected into the gap G via one of these ports 22, as will be described below.

The socket 14 is configured to maintain a coaxial relationship between the pipe section 16 and the socket 14 and such that the gap G is substantially circumferentially uniform. This allows a bonding agent (BA, FIGS. 11 and 13) injected into the gap G to have a substantially circumferentially uniform thickness, which results in a strong, uniform bond between the pipe section 16 and the fitting 12.

In the embodiment illustrated in FIG. 2, a grab ring 30 is positioned within the socket 14. In addition to further aligning the pipe section 16 in the socket 14, the grab ring 30 also prevents the pipe section from being pulled out of the socket 14. As will be described below, the grab ring 30 has teeth which become embedded into the inner surface 14a of the socket 14 and outer surface 16b of the pipe section 16 to prevent pipe pull-out once inserted into the socket 14. In addition to helping align the pipe section 16 in the center of the socket 14 and preventing pipe pull-out, the grab ring 30 also provides some resistance to pipe rotation within the socket 14.

In the embodiment illustrated in FIG. 3, a plurality of raised members or bumps 40 extend outwardly from the inner surface 14a of the socket 14 in circumferentially spaced-apart relationship. For example, in some embodiments, the bumps 40 are substantially equidistantly spaced-apart. For example, in some embodiments, there are three bumps spaced-apart by 120°. The bumps 40 may be a molded feature of the socket 14. Although illustrated as bumps, the raised members 40 may have various shapes and configurations and there may be various numbers of raised members 40 (typically at least three).

Figure 4:
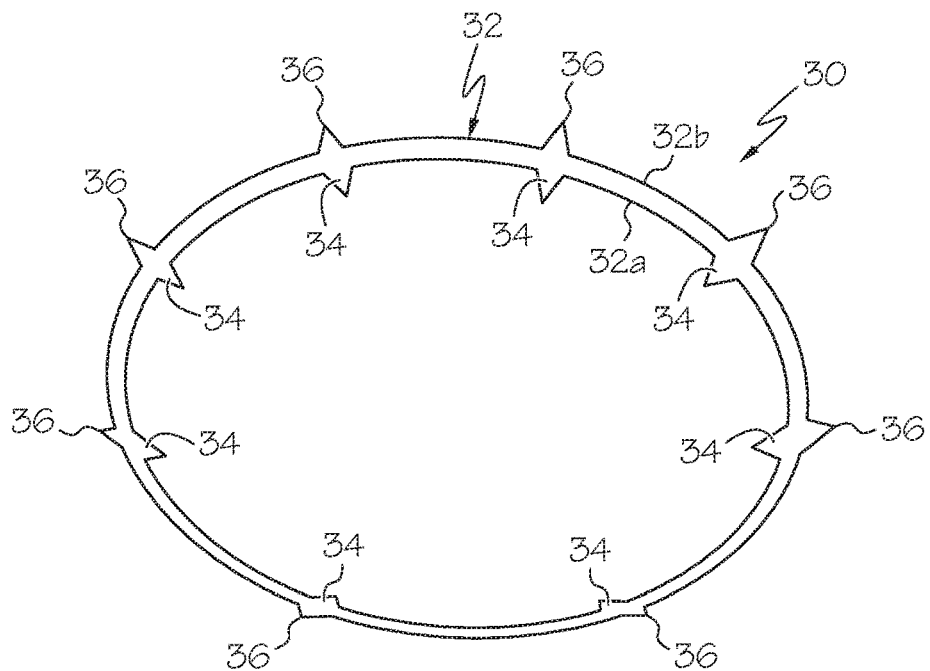
FIG. 4 is a perspective view of a pipe joint grab ring, according to some embodiments of the present invention.

Referring to FIG. 4, a grab ring 30, according to some embodiments of the present invention, is illustrated. The illustrated grab ring 30 includes an annular member 32 that has opposite inner and outer peripheral edges 32a, 32b. The illustrated grab ring 30 has a frusto-conical shape. The illustrated grab ring 30 is configured to be secured within the socket 14 of the tubular member 12 (FIG. 2) or the socket of other types of pipe fittings and/or connectors.

A first plurality of inwardly projecting gripping teeth 34 are on the inner peripheral edge 32a in circumferentially spaced-apart relationship. A second plurality of outwardly projecting gripping teeth 36 are on the outer peripheral edge 32b in circumferentially spaced-apart relationship. Typically, adjacent ones of the first plurality of gripping teeth 34 are spaced-apart between about one-quarter inch and about one inch (0.25"-1.0"). Similarly, adjacent ones of the second plurality of gripping teeth 36 typically are spaced-apart between about one-quarter inch and about one inch (0.25"-1.0"). However, the first plurality of gripping teeth 34 may be spaced apart by various other distances, and the second plurality of gripping teeth 36 may be spaced apart by various other distances.

In the illustrated embodiment of FIG. 4, the first and second plurality of teeth 34, 36 have a triangular shape and are substantially the same size. However, the first and/or second plurality of teeth 34, 36 may have various other shapes. In addition, each one of the first plurality of gripping teeth 34 are substantially adjacent to a respective one of the second plurality of gripping teeth 36. However, in other embodiments, the first and second plurality of gripping teeth 34, 36 may be staggered relative to each other.

Figure 6:
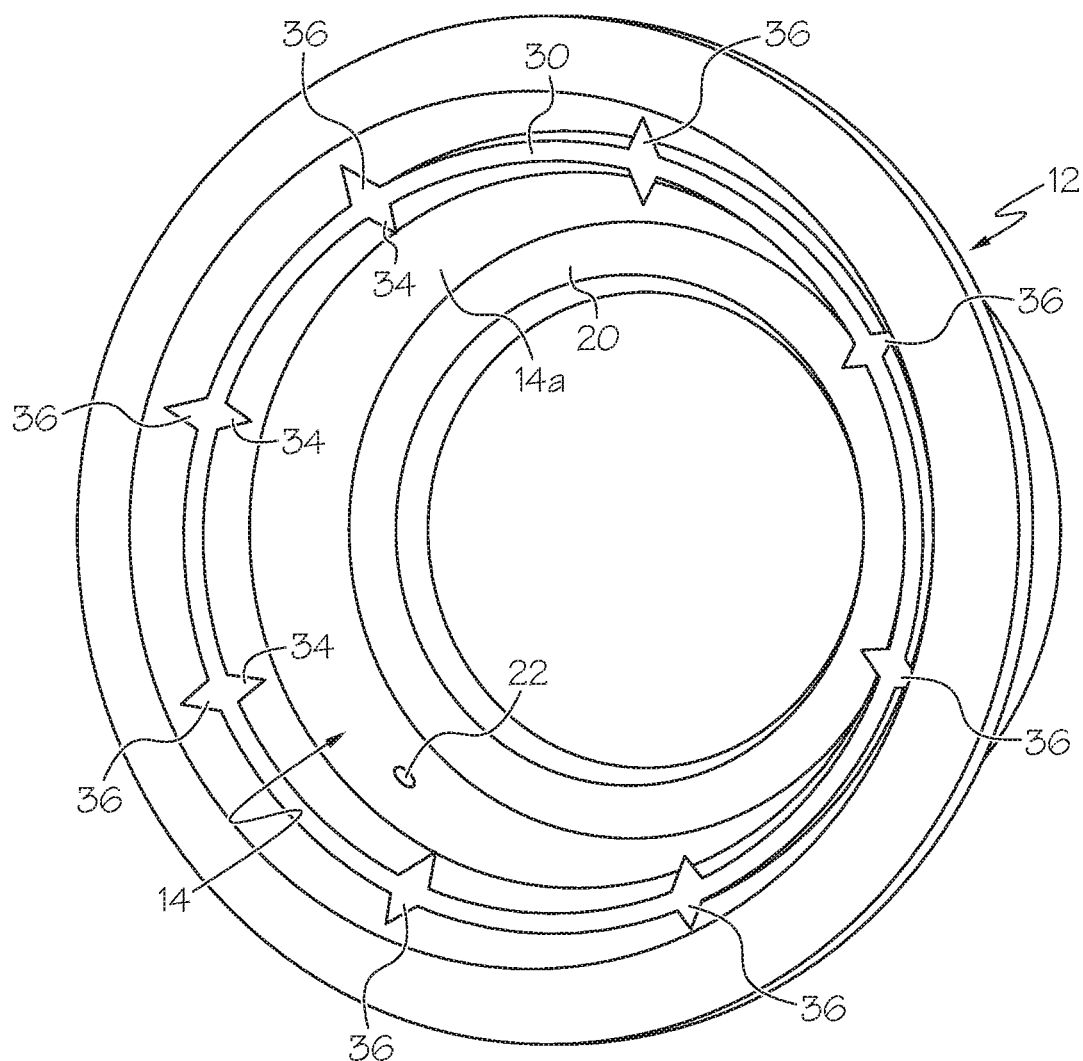
FIG. 6 illustrates the grab ring of FIG. 4 secured within a socket of a pipe fitting, according to some embodiments of the present invention.

The first plurality of gripping teeth 34 are configured to grip the outer surface 16b of a pipe section 16 inserted within the socket 14 of the pipe fitting 10. In addition, the second plurality of gripping teeth 36 are configured to grip a portion of the inner surface 14a of the socket 14, as illustrated in FIG. 6.

Figure 5:
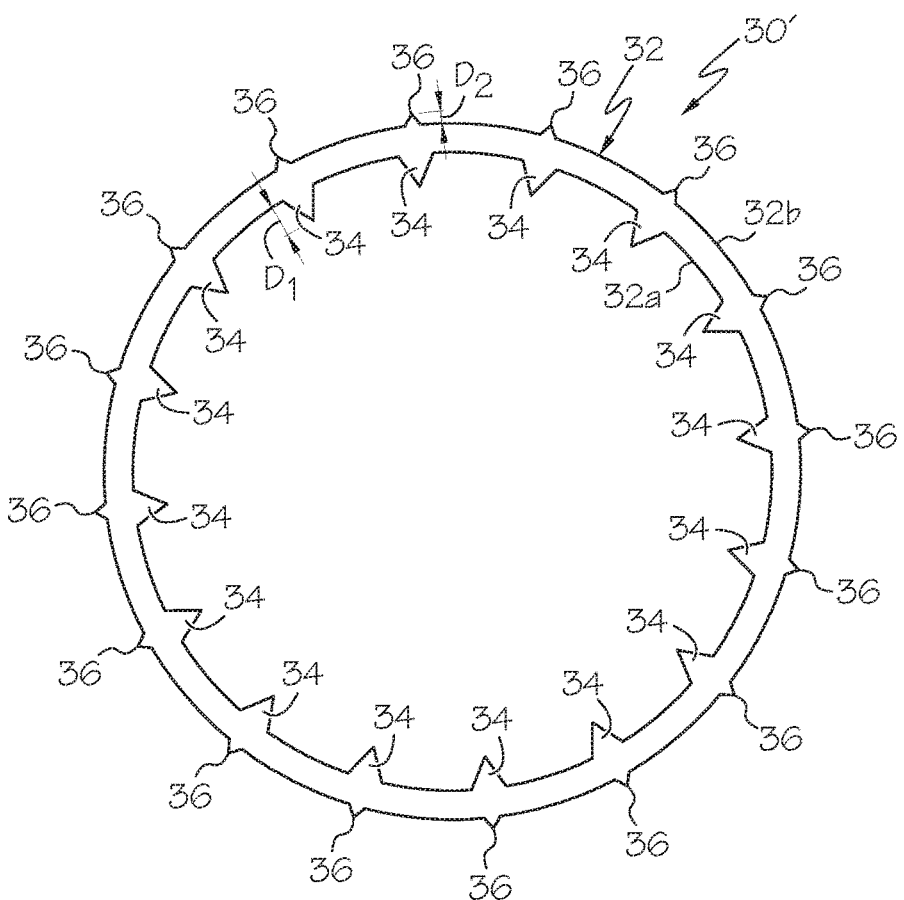
FIG. 5 is a plan view of a pipe joint grab ring, according to some embodiments of the present invention.

Referring to FIG. 5, a pipe joint grab ring 30', according to other embodiments of the present invention, is illustrated. The illustrated grab ring 30' includes an annular member 32 that has opposite inner and outer peripheral edges 32a, 32b. The illustrated grab ring 30' has a generally planar configuration and is configured to be secured within the socket 14 the tubular member 12 (FIG. 2) or the socket of other types of pipe fittings/connectors.

A first plurality of inwardly projecting gripping teeth 34 are on the inner peripheral edge 32a in circumferentially spaced-apart relationship. A second plurality of outwardly projecting gripping teeth 36 are on the outer peripheral edge 32b in circumferentially spaced-apart relationship. As with the grab ring embodiment illustrated in FIG. 4, typically, adjacent ones of the first plurality of gripping teeth 34 are spaced-apart between about one-quarter inch and about one inch (0.25"-1.0"). Similarly, adjacent ones of the second plurality of gripping teeth 36 typically are spaced-apart between about one-quarter inch and about one inch (0.25"-1.0"). However, the first plurality of gripping teeth 34 may be spaced apart by various other distances, and the second plurality of gripping teeth 36 may be spaced apart by various other distances.

In the illustrated embodiment of FIG. 5, the first and second plurality of teeth 34, 36 have a triangular shape and each one of the first plurality of gripping teeth 34 are substantially adjacent to a respective one of the second plurality of gripping teeth 36. However, in other embodiments, the first and second plurality of gripping teeth 34, 36 may have other shapes and may be staggered relative to each other.

In the illustrated embodiment of FIG. 5, the first plurality of gripping teeth 34 are larger than the second plurality of gripping teeth 36. Moreover, a distance $D_1$ that each of the first plurality of gripping teeth 34 project inwardly from the inner peripheral edge 32a is greater than a distance $D_2$ that each of the second plurality of gripping teeth 36 project outwardly from the outer peripheral edge 32b.

The pipe joint grab rings 30, 30' of FIGS. 4 and 5 may be formed of various materials without limitation. Exemplary materials include, but are not limited to aluminum and stainless steel (e.g., SS 304, etc.).

Figure 7:
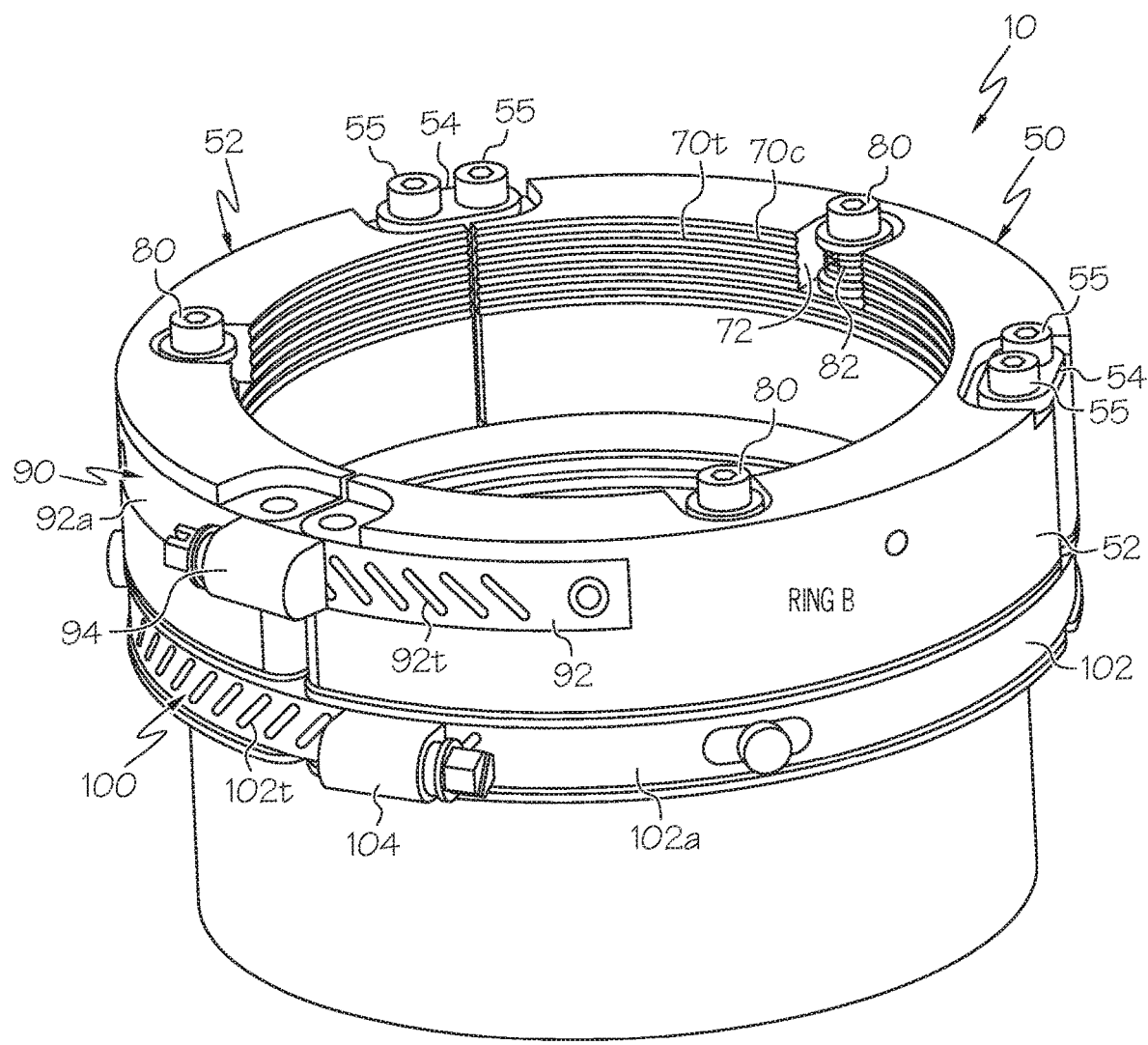
FIG. 7 is a perspective view of a removable clamp that can be utilized with the pipe fittings of FIGS. 1 and 2, according to some embodiments of the present invention.
Figure 8:
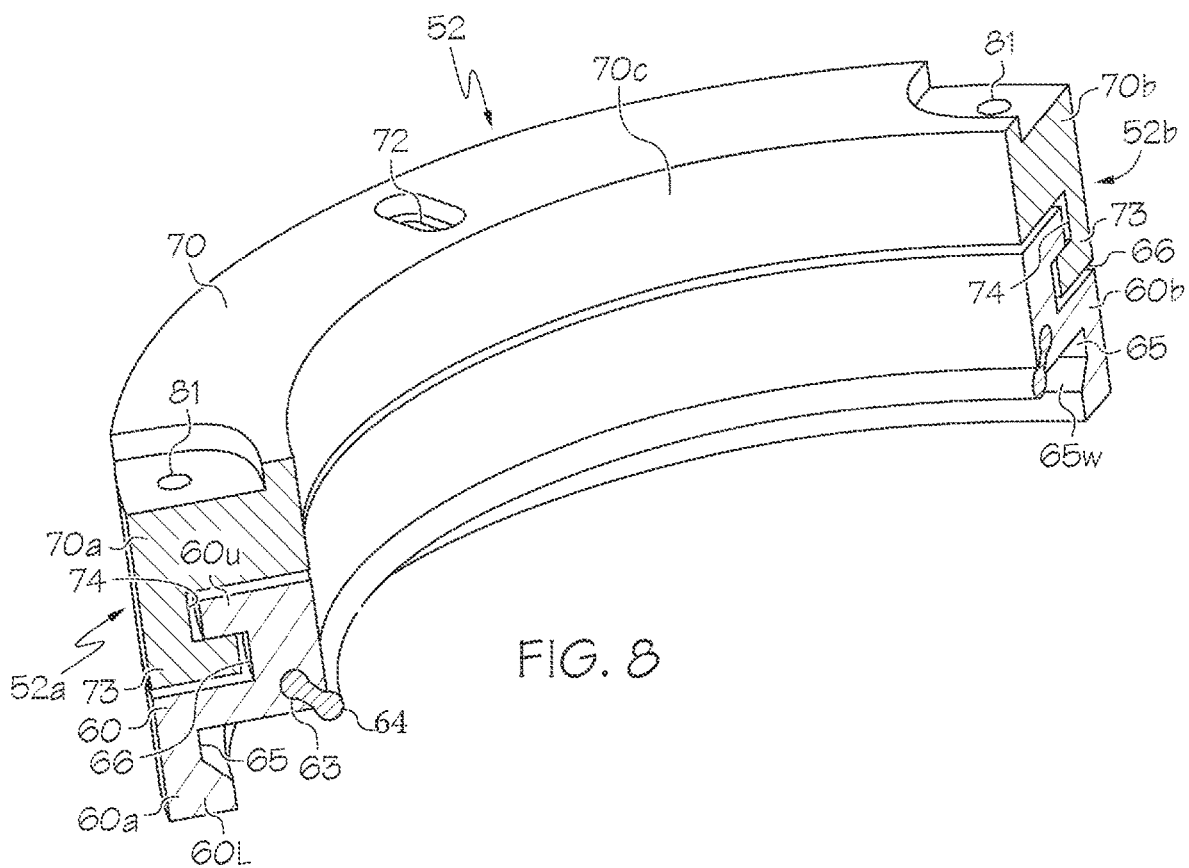
FIG. 8 is a perspective view of one of the arcuate segments of the removable clamp of FIG. 7.

Referring to FIGS. 1-3 and 7, the illustrated pipe fitting 10 also includes a removable and reusable clamp 50 that secures the pipe section 16 (FIGS. 1-3) within the socket 14 as a bonding agent is injected into the gap G via one of the ports 22. The illustrated clamp 50 includes a plurality of arcuate segments 52. In the illustrated embodiment, the clamp includes three arcuate segments 52, each defining an arc of about 120°. However, embodiments of the present invention are not limited to three arcuate segments. Various numbers of arcuate segments 52 may be utilized. As illustrated in FIG. 8, each arcuate segment 52 includes first and second members 60, 70 that are matingly engaged and are secured together via a fastener. As such, the plurality of first and second members when joined together as described below form two rings (Ring A and Ring B) that are movably secured to each other and that work in concert with each other. Operation of the "A" and "B" rings are identified in cross-sectional view in FIGS. 10-13.

The first and second members 60, 70 of each arcuate segment 52 are secured together via a threaded fastener 80. As illustrated, the threaded fastener 80 extends through an aperture 72 in the second member 70 and threadingly engages threads 62 formed in the first member 60. A biasing member or spring 82 is associated with the fastener 80 and allows the first and second members 60, 70 (and, thereby, Ring A and Ring B) to axially separate as Ring A is radially compressed, as will be described below.

In the illustrated embodiment there are three arcuate segments 52, each having opposite end portions 52a, 52b. Accordingly, there are three locations where end portion 52a of one arcuate segment 52 is adjacent end portion 52b of an adjacent arcuate segment. The three arcuate segments 52 are joined together at two of these locations via hinges 54 (FIG. 7). The hinges facilitate movement of the arcuate segments 52 relative to each other to facilitate installation of the clamp 50 around a pipe fitting 12 and pipe section 16. In the illustrated embodiment, the hinges 54 are secured to adjacent end portions 70a, 70b of the second members 70 via threaded fasteners 55 which are threadingly secured to the second members 70 via threaded openings 81. However, there are various ways of connecting adjacent end portions 70a, 70b of the second members 70 and embodiments of the present invention are not limited to the illustrated configuration.

At the third location where end portion 52a of one arcuate segment 52 is adjacent end portion 52b of an adjacent arcuate segment, a tightening member 90 (FIG. 7) is provided. When the clamp 50 is installed on the pipe section 16 and pipe fitting 12, the tightening member 90 is used to radially compress the second members 70 into contact with the outer surface 16b of the pipe section 16. The illustrated tightening member 90 includes an elongated band 92 secured to one of the second members 70 and a rotatable member 94 secured to the adjacent second member 70. The band 92 includes a thread pattern 92t (e.g., similar to a hose clamp, etc.) formed in a surface 92a thereof. The rotatable member 94 includes a rotatable worm with teeth (not shown) that are configured to engage the thread pattern 92t. Rotation of the worm in one direction causes the tightening member 90 to radially compress the second members 70 into contact with the outer surface 16b of the pipe section 16 such that the clamp 50 is secured to the pipe section 16. In the illustrated embodiment, each second member 70 includes a contact surface 70c that includes teeth 70t for gripping the outer surface 16b of the pipe section 16.

Each arcuate segment 52 also includes a sealing member 64 (FIG. 8) attached to the first member 60, thereof. In the illustrated embodiment, each arcuate segment first member 60 includes a slot 63 formed therein. The sealing member 64 is an elastomeric material, such as rubber, and has a bar-bell or dog-bone shaped cross-sectional configuration and is configured to slide into the slot 63. This allows the sealing member 64 to be replaced if damaged and for cleaning purposes.

Figure 9:
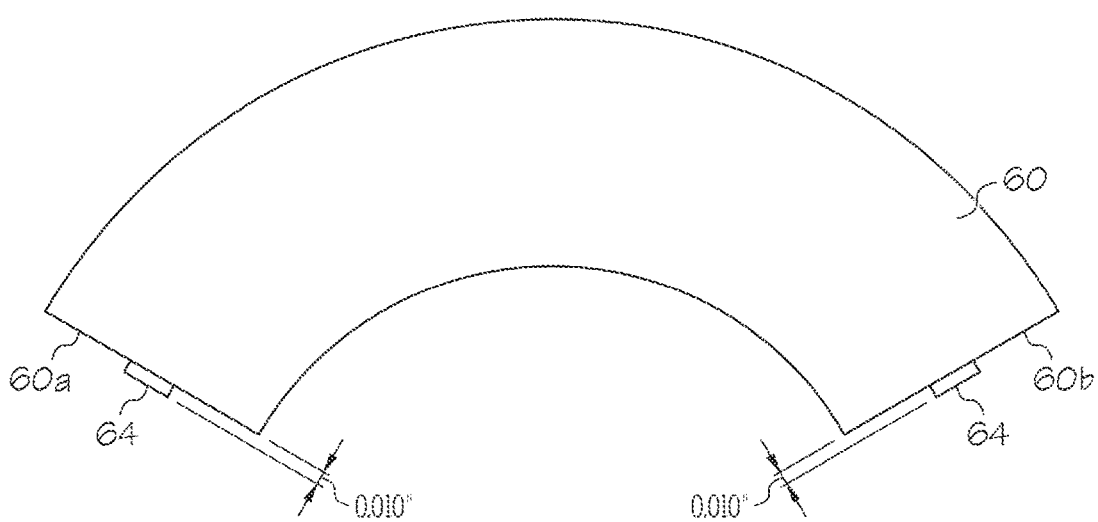
FIG. 9 is a plan view of one of the arcuate segments of the removable clamp of FIG. 7 and illustrating the length of a sealing member relative to a length of the arcuate segment.

As illustrated in FIG. 9, each sealing member 64 has a length that is greater than a length of the respective arcuate segment first member 60 to which the sealing member 64 is attached. For example, in some embodiments, the length of each sealing member may be at least about 0.010 inch longer than the length of the arcuate segment first member 60. This extra length ensures that the ends of each sealing member 64 touch the ends of adjacent sealing members 64, thereby forming an annular seal that surrounds the pipe section 16. This annular seal prevents leakage of the bonding agent during the injection process.

As illustrated in FIGS. 2, 3, 8 and 10-13, the first and second members 60, 70 of each arcuate segment 52 are matingly engaged with each other. Each first member 60 has a serpentine or "S-shaped" cross-sectional configuration with an upper portion 60u and a lower portion 60L and that includes opposing arcuate grooves or channels 65, 66, as illustrated. Each second member 70 has a lower end portion 73 that has a generally "L-shaped" configuration that includes an arcuate groove or channel 74. An upper portion 60u of the first member is located within the channel 74 of the second member 70. The channel 74 has a height H1 that that is greater than a height H2 of the first member upper portion 60u. This allows the first members 60 of the arcuate segments 52 to move axially relative to the second members 70 during tightening of the clamp 50, as will described below.

The arcuate channel 65 in each of the first members 60 includes a sloped inner wall 65w, as illustrated. The tubular member 12 includes an annular flange 12f having a sloped outer wall 12w. When the clamp 50 is installed around a pipe section 16 and fitting 14, the arcuate groove 65 of each of the first members 60 receives the tubular member annular flange 12f therein. The sloped inner wall 65w of the groove 65 engages the annular flange sloped outer wall 12w. This configuration allows the first members 60 of each arcuate segment 52 to move axially away from the second members 70 as the first members 60 are moved radially inwardly via a tightening mechanism 100.

The illustrated tightening member 100 is configured to radially compress the first members 60 of each arcuate segment 52 such that the first members move radially and compress the respective sealing members 64 into sealing engagement with the tubular member 12 and pipe section 16 to seal an open end of the gap G. When a bonding agent is injected into the gap via a port, the sealing members prevent the bonding agent from leaking out of the open end of the socket. Once the bonding agent is injected, the clamp 50 is removed and can be reused. The clamp 50 may be removed before or after the bonding agent cures.

The illustrated tightening member 100 includes an elongated band 102 (FIG. 7) that extends around the first members 60 and includes a rotatable member 104. The band 102 includes a thread pattern 102t (e.g., similar to a hose clamp, etc.) formed in a surface 102a thereof. The rotatable member 104 includes a rotatable worm with teeth (not shown) that are configured to engage the thread pattern 102t. Rotation of the worm in one direction causes the tightening member 100 to radially compress the first members 60 (i.e., Ring A) such that the first members 60 move radially and compress the respective sealing members 64 into sealing engagement with the tubular member 12 and pipe section 16 to seal an open end of the gap G.

Figure 10:
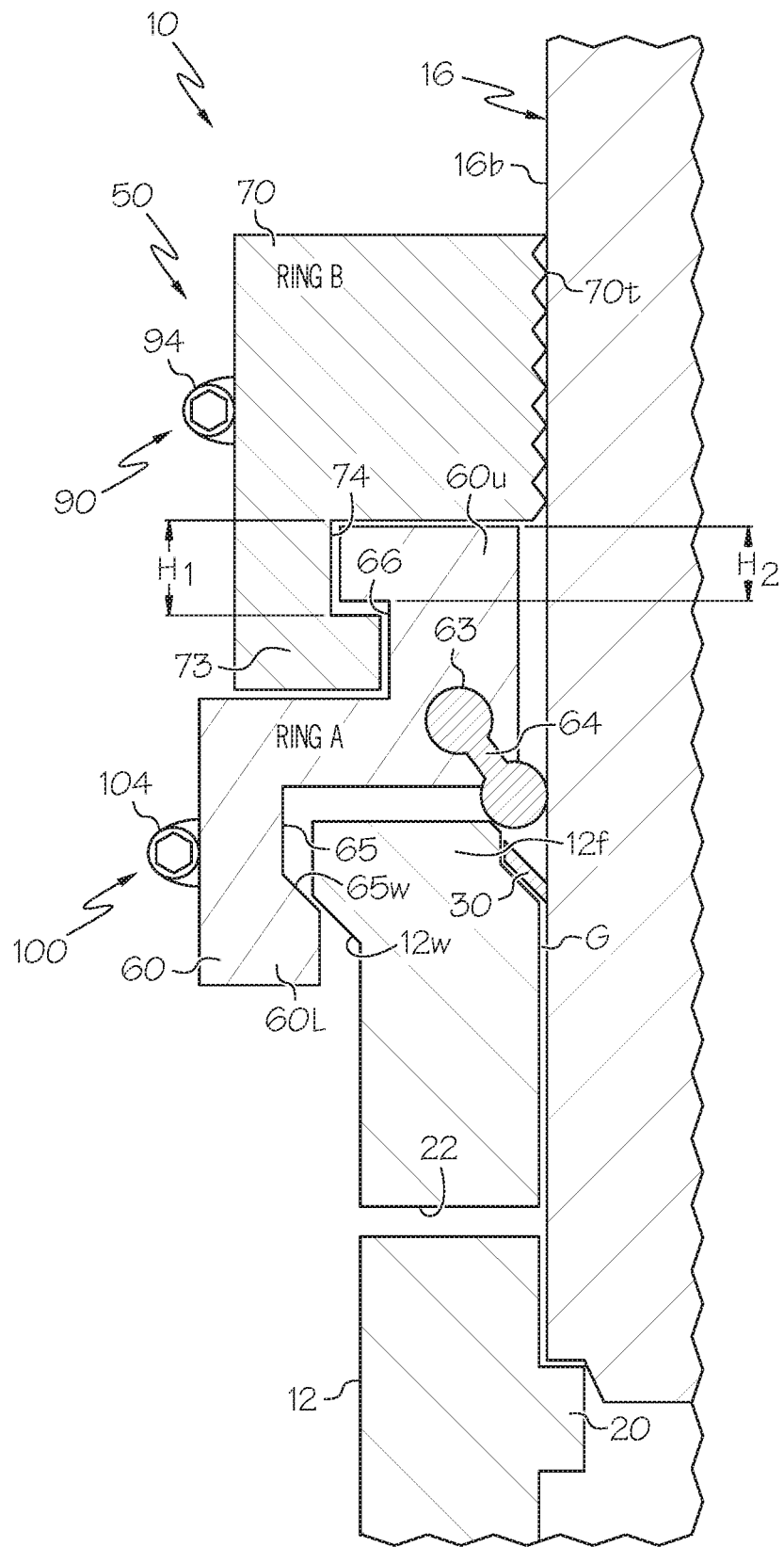
FIGS. 10 and 11 are partial views of the pipe fitting of FIG. 2 and illustrate relative movement between the first and second members of an arcuate segment of the removable clamp as the clamp is tightened.
Figure 11:
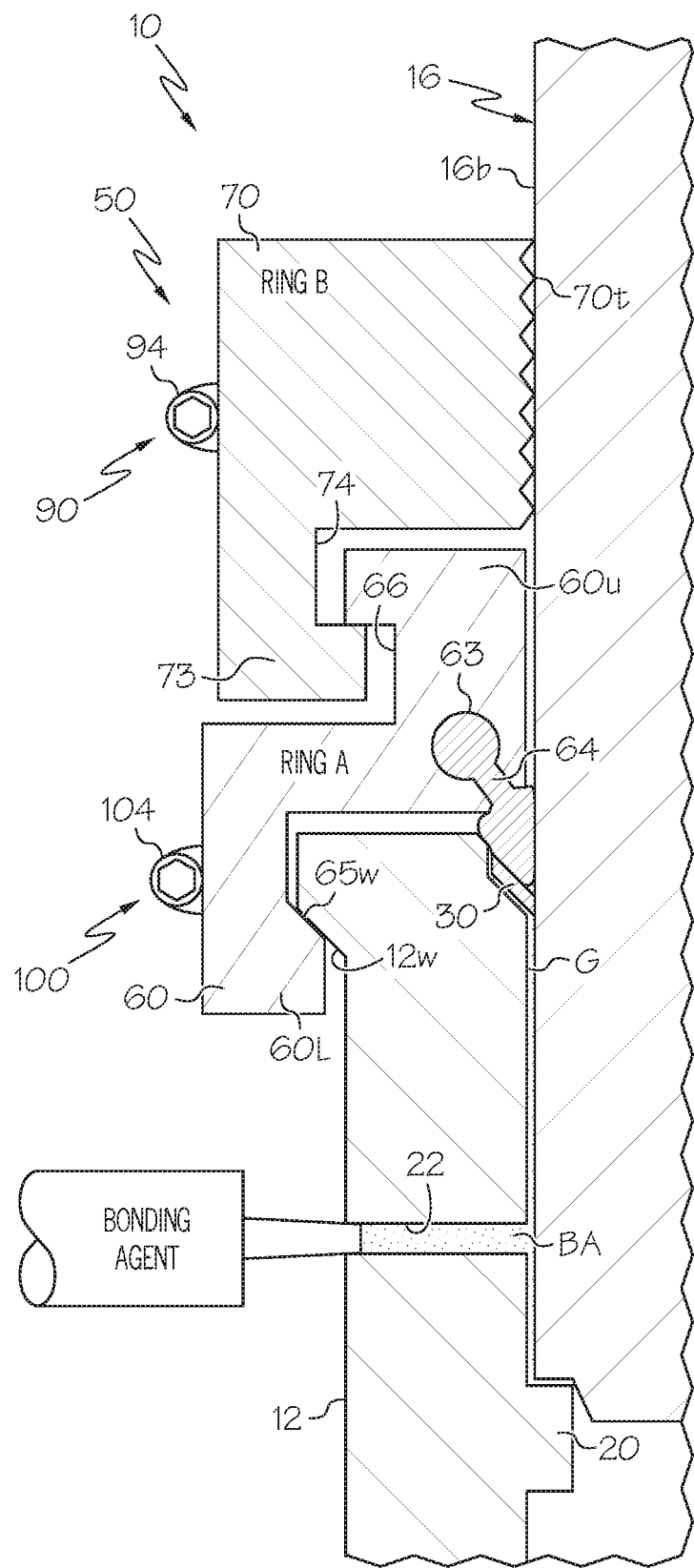
Figure 12:
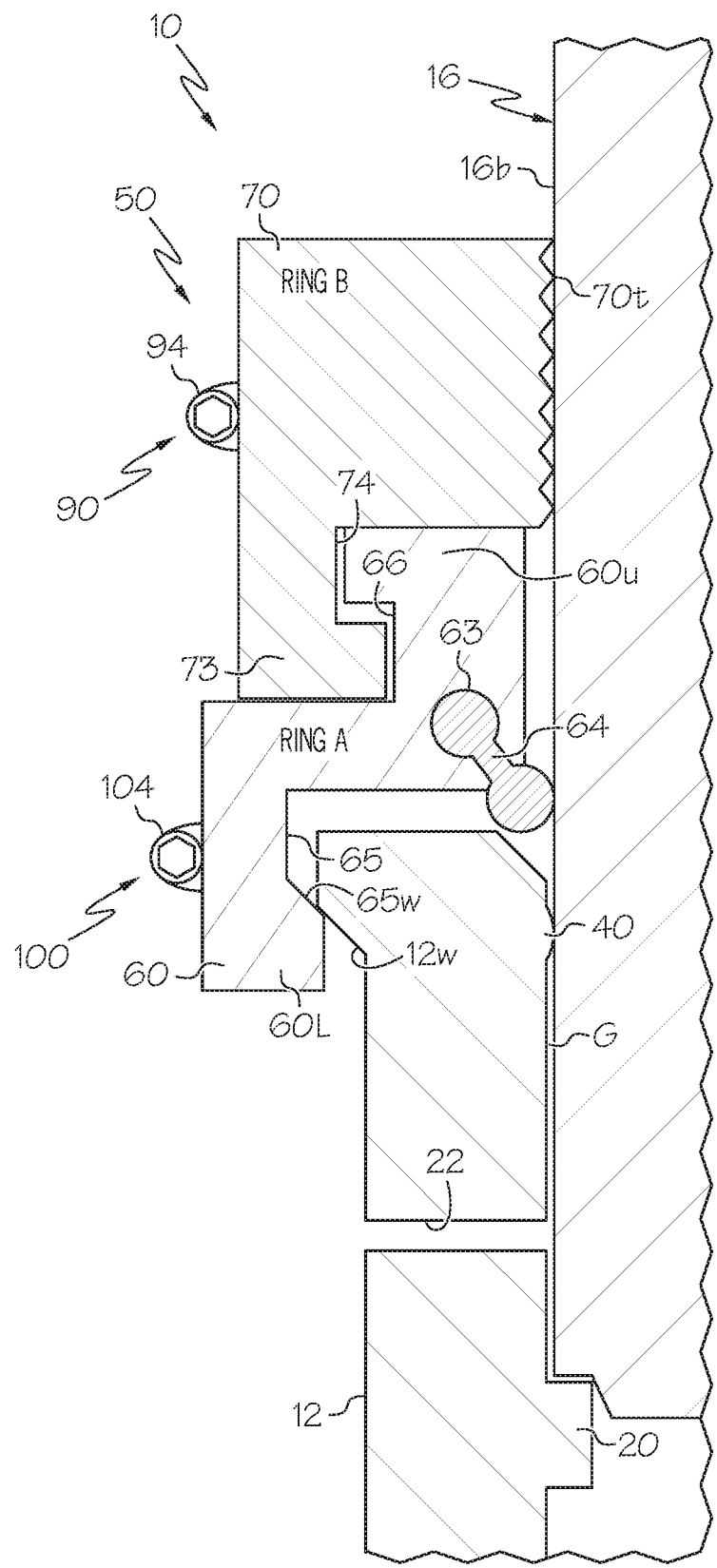
FIGS. 12 and 13 are partial views of the pipe fitting of FIG. 3 and illustrate relative movement between the first and second members of an arcuate segment of the removable clamp as the clamp is tightened.
Figure 13:
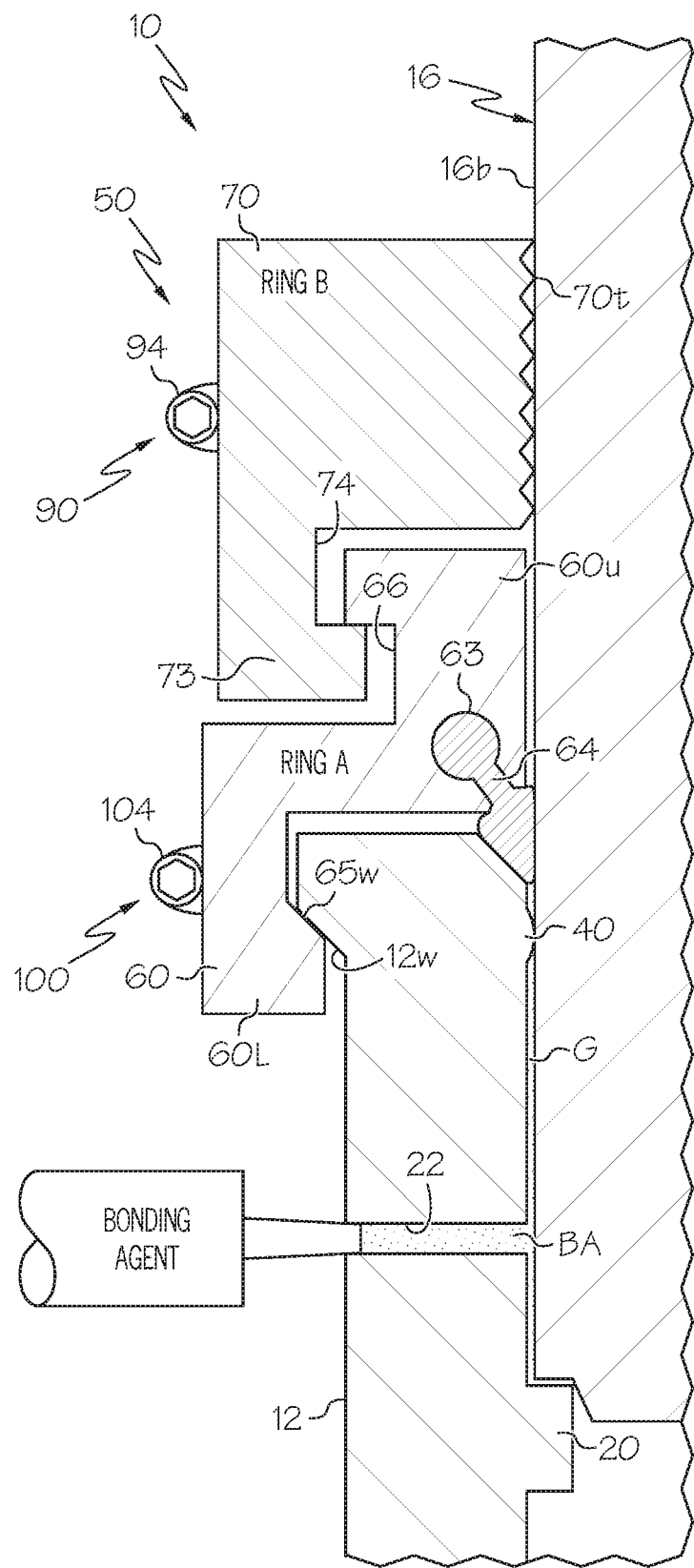

Radial compression of the first members 60 also causes the first members 60 to move axially away from the second members as the sloped inner walls 65w of the grooves 65 of the first members 60 engage the annular flange sloped outer wall 12w. This is illustrated in FIGS. 10-13. FIGS. 10 and 11 illustrate the embodiment of FIG. 2 wherein the grab ring 30 is utilized and FIGS. 12 and 13 illustrate the embodiment of FIG. 3 wherein the plurality of circumferentially spaced-apart raised members or bumps 40 are utilized.

In FIGS. 10 and 12, the clamp 50 is installed on the pipe section 16 and fitting 12. The upper tightening member 90 has been tightened such that the second members 70 are radially compressed into contact with the outer surface 16b of the pipe section. The lower tightening member 100 is loose in FIGS. 10 and 12. Referring now to FIGS. 11 and 13, the lower tightening member 100 has been tightened such that the first members 60 are compressed radially inwardly. The radial compression causes the first members 60 to move axially away from the second members 70 (downwardly in FIGS. 11 and 13) as the sloped inner wall 65w of each groove 65 slides along the annular flange sloped outer wall 12w. As such, the sealing members 64 are compressed into sealing engagement with the tubular member 12 and pipe section 16 to seal an open end of the gap G, as illustrated in FIGS. 11 and 13.

The pipe fitting is ready to receive a bonding agent BA in the gap G, as illustrated in FIGS. 11 and 13. Typically, only one of the ports 22 is used for injecting the bonding agent into the gap G that is formed between the outer surface 16b of the pipe section 16 and the inner surface 14a of the socket 14, and the other port 22 is used as a vent to allow air to escape as it is pushed out by the bonding agent, and to identify when the gap is full of bonding agent. Exemplary bonding agents that may be used to join the pipe section 50 and the connector 30 are described in, for example, U.S. Pat. Nos. 4,052,244, 5,656,345, 6,949,602, U.S. Patent Application Publication No. 2013/0267670, and U.S. Patent Application Publication No. 2013/0261247, all of which are incorporated herein by reference in their entireties. Once the bonding agent BA is injected into the gap G, the clamp 50 is removed. The clamp 50 may be removed before or after the bonding agent BA cures.

Figure 14:
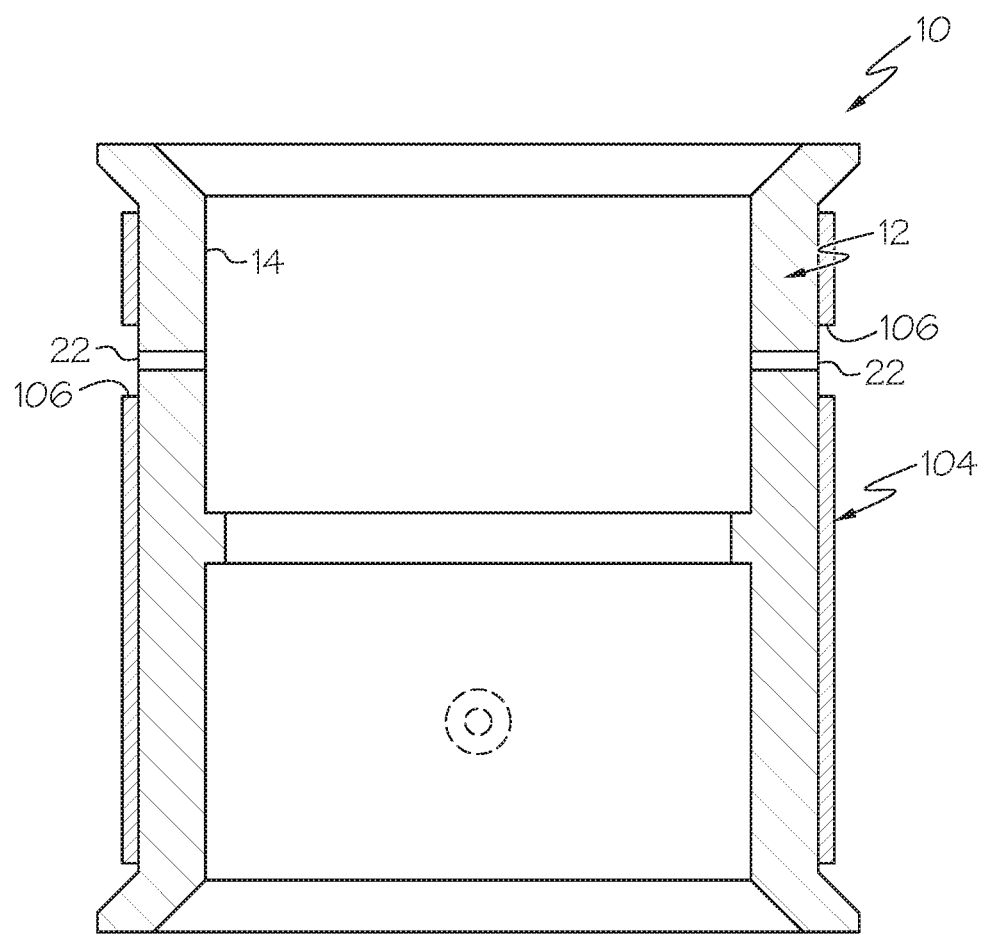
FIG. 14 is a side cut-away view of a pipe fitting with a reinforcement band positioned therearound, according to some embodiments of the present invention.

Referring now to FIG. 14 the pipe fitting 10 of FIGS. 1-3 is illustrated with a reinforcement band 104 positioned therearound. As described above, the pipe fitting has a tubular member 12 with a socket 14 configured to receive an end of a pipe section therein. A pair of ports 22 extend through the tubular member 12 that facilitate the injection of adhesive into the socket, as described above. The illustrated reinforcement band 104 includes openings 106 formed therein to provide access to the ports 22. The reinforcement band 104 can have various shapes, sizes and configurations. Embodiments of the present invention are not limited to the illustrated configuration of the reinforcement band 104.

The reinforcement band 104 may be secured (e.g., adhesively secured, etc.) to the outer surface of the tubular member 12 or may be positioned onto the tubular member 12 and held in place via friction. Other methods of securing the reinforcement band 104 around the tubular member 12 are possible including, but not limited to, crimping, clamping (e.g., via a clamp, such as a pipe or hose clamp), etc. In some embodiments, the reinforcement band 104 may be positioned and/or secured onto the tubular member 12 during manufacturing of the tubular member 12.

The reinforcement band 104 may be formed from various materials, but is typically a metal reinforcement band, such as, but not limited to, steel, stainless steel, aluminum, brass, etc. The reinforcement band 104 is typically used in high pressure and/or temperature piping environments. The reinforcement band can reduce stress in the wall of the pipe fitting 10 in the hoop direction and can provide dimensional stability.

Figure 15:
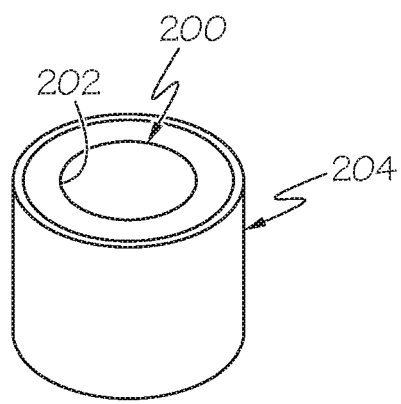
FIG. 15 is a perspective view of a pipe fitting with a reinforcement band positioned therearound, according to some embodiments of the present invention.
Figure 16:
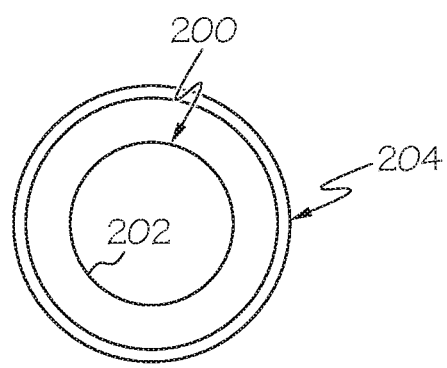
FIG. 16 is an end view of the pipe fitting of FIG. 15 illustrating the reinforcement band.

Referring now to FIGS. 15 and 16, a pipe fitting 200 comprising a socket 202 that is configured to receive an end of a pipe section therein is illustrated. The illustrated pipe fitting 200 is referred to as a "brush on" pipe fitting in that adhesive is applied to the outer surface of the end of a pipe section, for example via an applicator such as a brush, prior to insertion into the pipe fitting socket 202. The pipe fitting 200 includes a reinforcement band 204 positioned around an outer surface of the pipe fitting 200, as illustrated. The reinforcement band 204 may be secured (e.g., adhesively secured, etc.) to the outer surface of the pipe fitting 200 or may be positioned onto the pipe fitting 200 and held in place via friction.

As described above with respect to FIG. 14, the reinforcement band 204 may be formed from various materials, but is typically a metal reinforcement band, such as, but not limited to, steel, stainless steel, aluminum, brass, etc. The reinforcement band 204 is typically used in high pressure and/or temperature piping environments. The reinforcement band can reduce stress in the wall of the pipe fitting 200 in the hoop direction and can provide dimensional stability. The reinforcement band 204 can have various shapes and configurations. Embodiments of the present invention are not limited to the illustrated configuration of the reinforcement band 204.

According to other embodiments of the present invention, a pipe fitting (e.g., pipe fitting 10 of FIGS. 1-3, pipe fitting 200 of FIGS. 15-16) may be formed with glass fiber reinforcement (GFR) material therein to improve hoop strength of the pipe fitting. The term "glass fiber", as used herein, is intended to include various types of reinforcing fibers including, but not limited to, glass, carbon, aramid, basalt, and the like.

A pipe fitting with GFR material therein is typically used in high pressure and/or temperature piping environments. The GFR material can reduce stress in the wall of the pipe fitting in the hoop direction and can provide dimensional stability.

Figure 17:
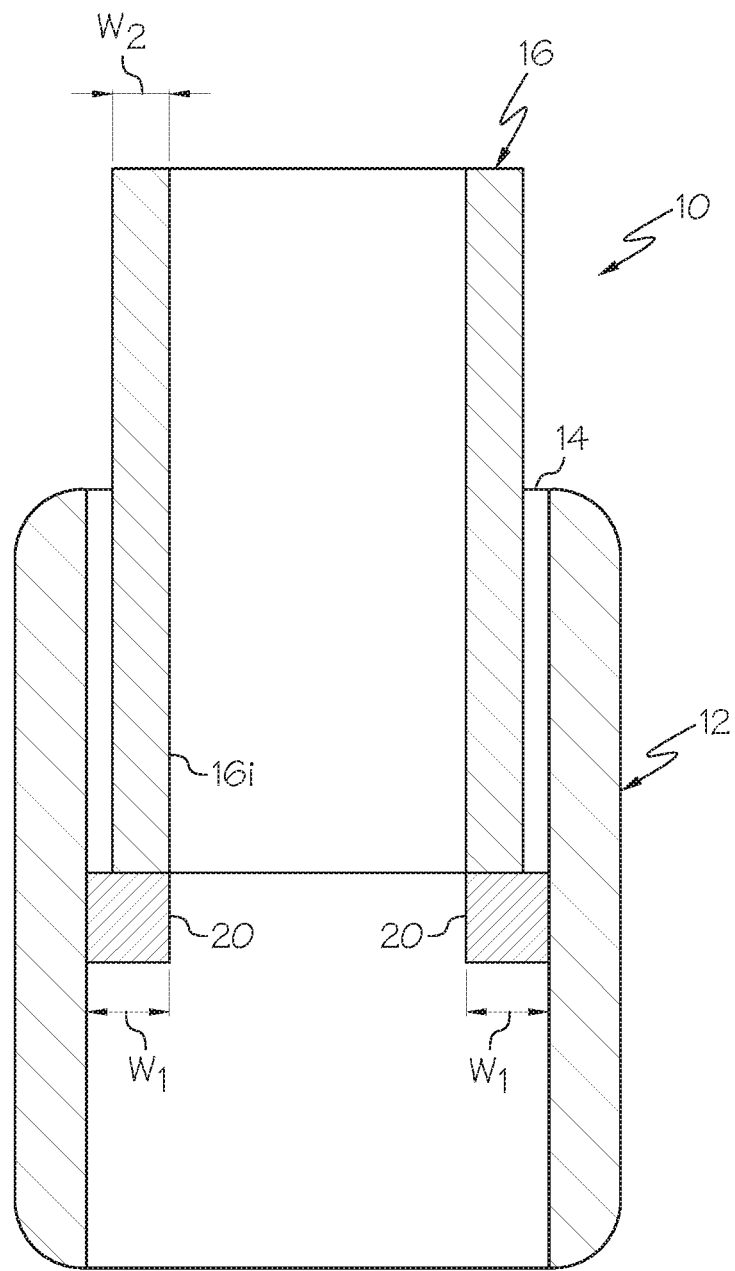
FIG. 17 is a side cut-away view of a pipe fitting with a pipe stop having an increased radial length, according to some embodiments of the present invention.

Referring now to FIG. 17, the pipe fitting 10 of FIGS. 1-3 is illustrated with a pipe stop 20 having an increased radial length $W_1$ as compared with the embodiment of FIGS. 1-3. In the illustrated embodiment of FIG. 17, the radial length $W_1$ of the pipe stop 20 is greater than the thickness $W_2$ of the wall of the pipe 16 inserted within the socket 14. In the illustrated embodiment, the radial length $W_1$ of the pipe stop causes the radial inner edge 20a of the pipe stop to align with the inner surface 16i of the pipe 16 inserted within the socket 14. The pipe stop 20 having the increased radial length, as illustrated in FIG. 17, increases the hoop strength of the socket and is typically used in high pressure and/or temperature piping environments. In other embodiments, the radial length $W_1$ of the pipe stop may be substantially the same as the thickness $W_2$ of the wall of the pipe 16.

Figure 18:
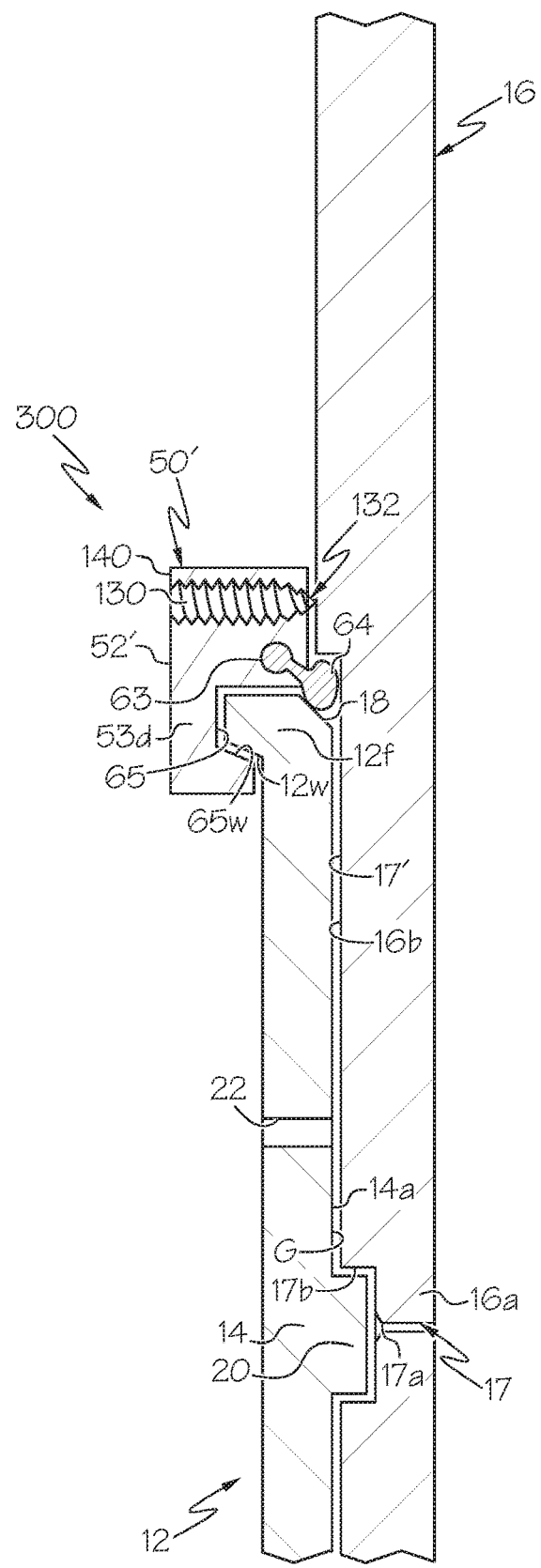
FIGS. 18 and 19 are side cut-away views of a pipe fitting that includes a tubular member having a socket, a pipe section inserted into the socket, and a removable clamp secured to the pipe fitting that has a plurality of circumferentially spaced-apart spring-loaded devices, according to some embodiments of the present invention.
Figure 19:
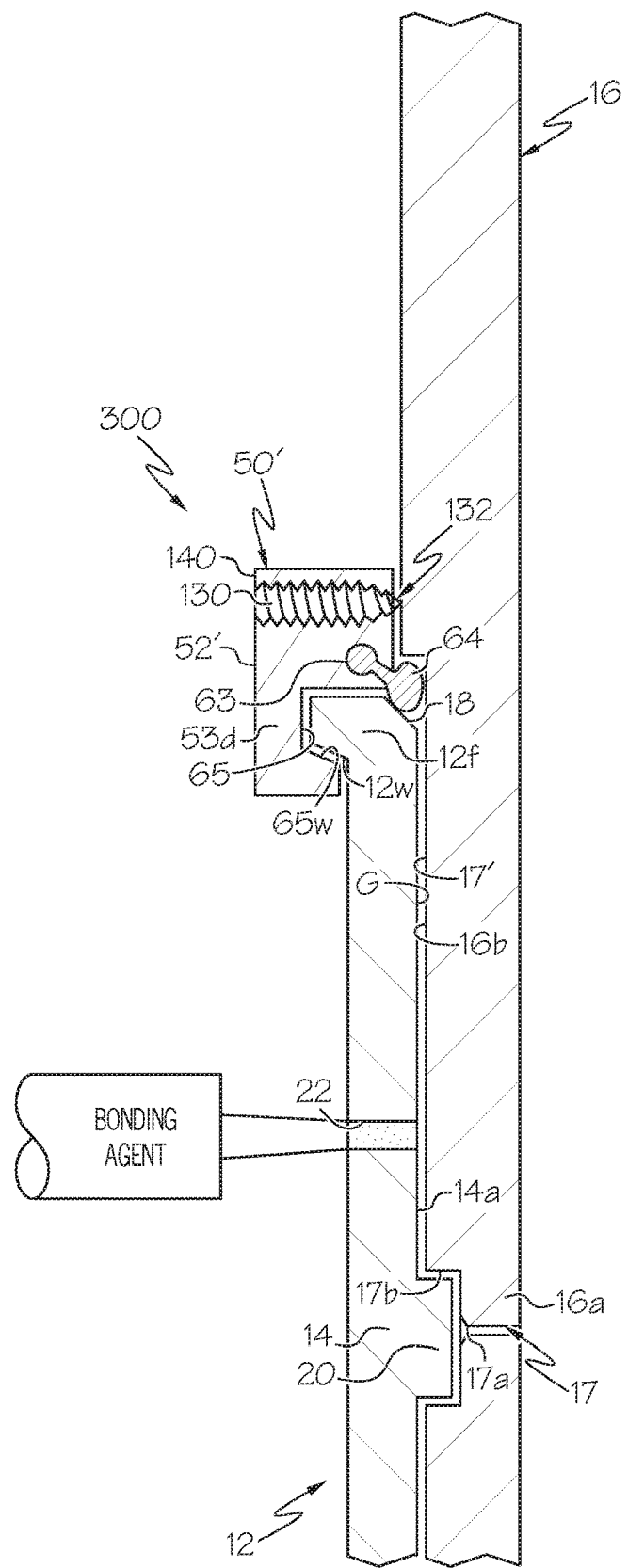

Referring now to FIGS. 18-19, a pipe fitting 300, according to some embodiments of the present invention, is illustrated. The pipe fitting 300 includes a tubular member 12 having a socket 14 configured to receive an end 16a of a pipe section 16 therein. The pipe fitting 300 can be shaped as a straight union, an elbow, a "T", a "Y", a cross or any other desired geometry. The socket 14 has an internal diameter Ds (FIG. 28) that is larger than the outer diameter Dp (FIG. 28) of the pipe section such that a gap G exists between an outer surface 16b of the pipe section 16 and an inner surface 14a of the socket 14 when the pipe section 16 is centered within the socket 14, as described above with respect to the embodiments of FIGS. 2-3. The socket 14 includes an open free end 18 through which the end 16a of the pipe section 16 is inserted and a pipe stop 20 that is configured to matingly engage with the end 16a of the pipe section. In the illustrated embodiment, the pipe stop 20 is an annular member that extends from the inner surface 14a of the socket 14.

Figure 28:
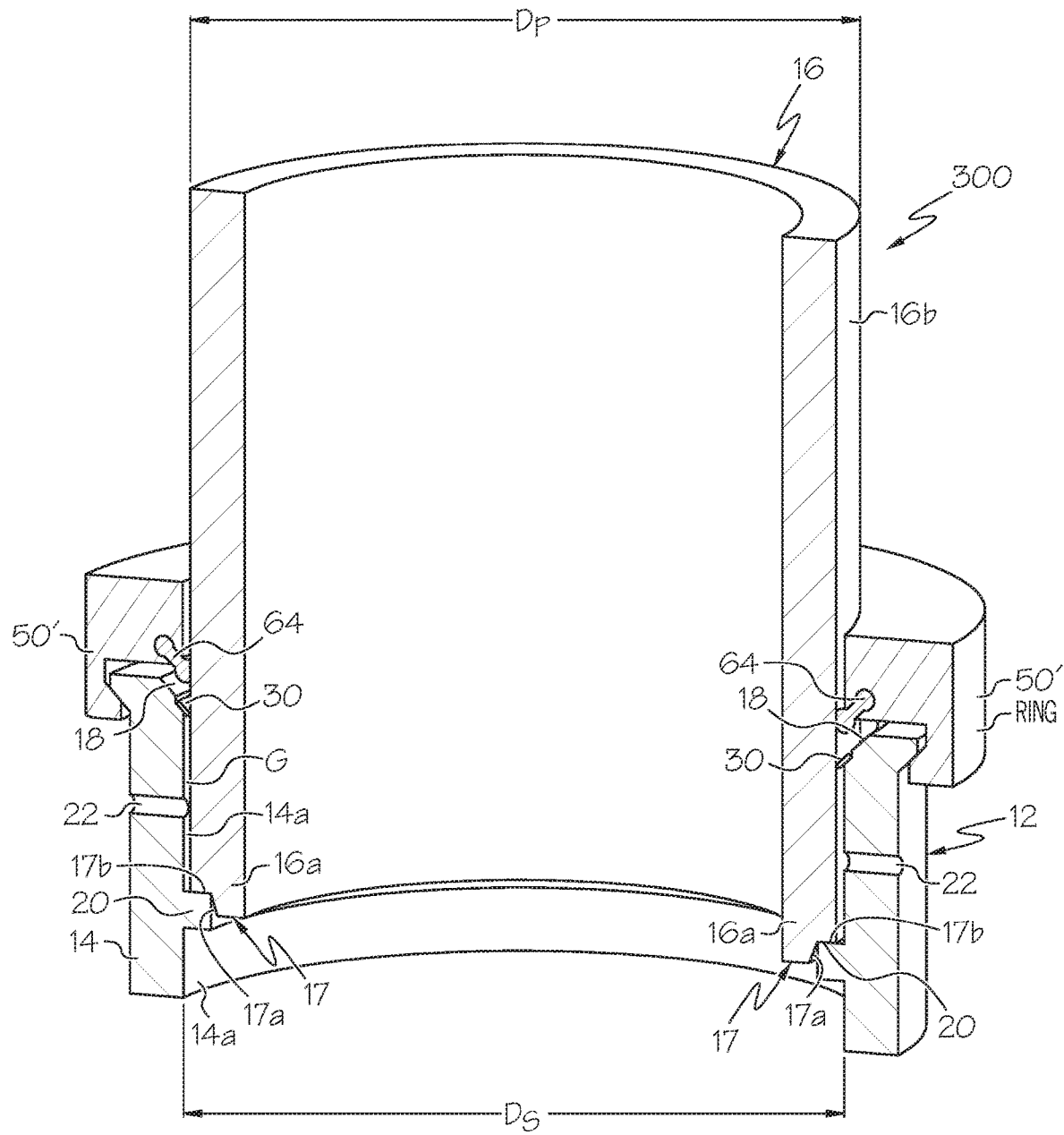
FIG. 28 is a cross-sectional view of a pipe fitting that includes a tubular member having a socket, a grab ring within the socket, and the removable clamp of FIG. 20. A portion of a male end of a pipe section is inserted into the socket and is being held in place via the clamp so that a bonding agent can be injected into a gap between the pipe section and the socket to join the pipe section to the pipe fitting.
Figure 29:
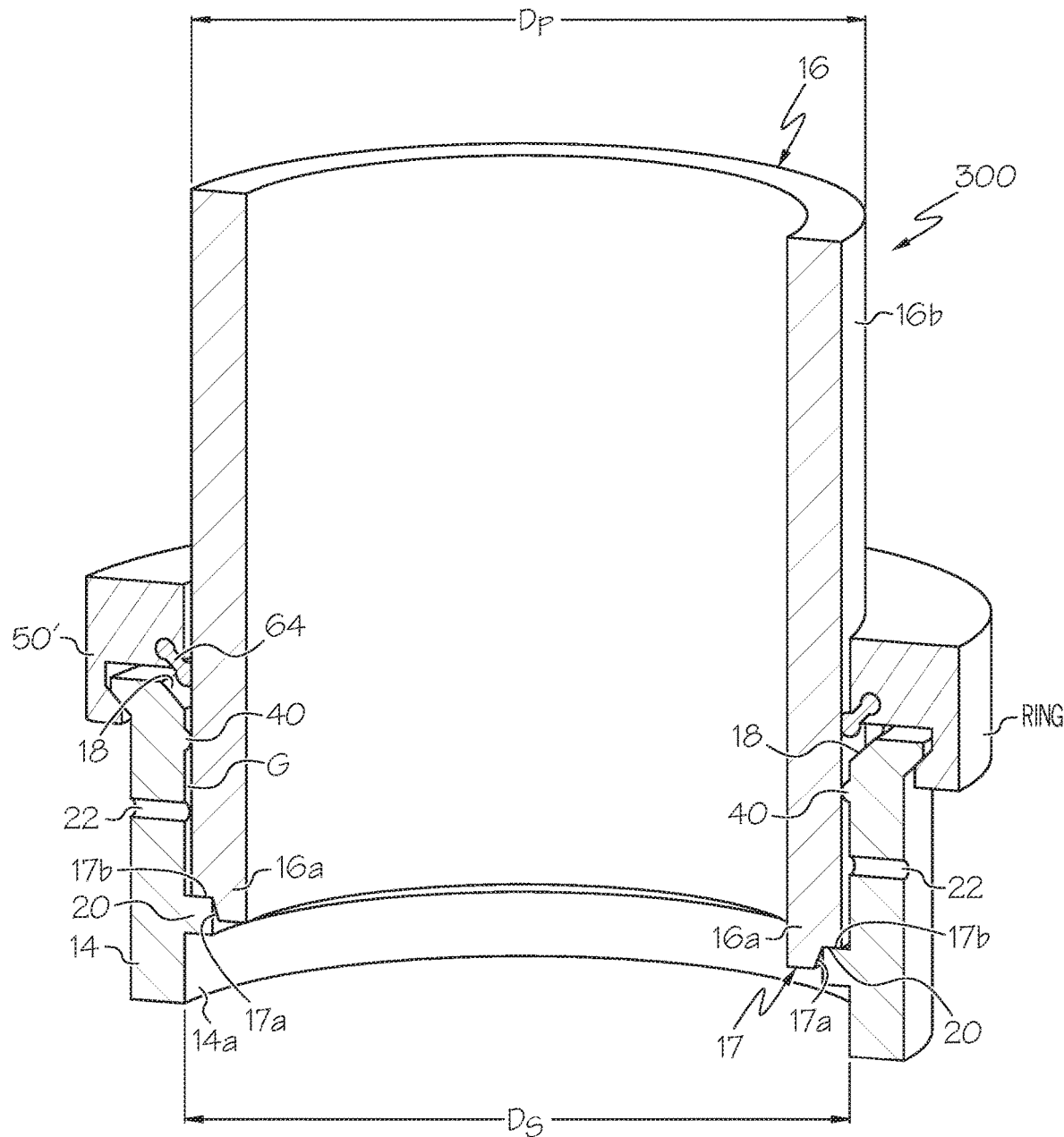
FIG. 29 is a cross-sectional view of a pipe fitting that includes a tubular member having a socket and the removable clamp of FIG. 20. The socket includes circumferentially spaced-apart raised members extending outwardly from an inner surface of the socket. A portion of a male end of a pipe section is inserted into the socket and is being held in place via the clamp so that a bonding agent can be injected into a gap between the pipe section and the socket to join the pipe section to the pipe fitting.

In some embodiments of the present invention, prior to insertion within the socket, material is removed from the pipe end 16a (e.g., via a hand tool or lathe, etc.) to create a profiled end 17 that matingly engages with the pipe stop 20. As illustrated in FIGS. 28 and 29, the profiled end 17 includes a tapered portion 17a and an engagement portion 17b. The tapered portion 17a is inserted into the opening of the annular pipe stop 20 and the engagement portion 17b is configured to abut against the pipe stop 20 in face-to-face relationship. The profiled end 17 effectively acts as a locating pin at the pipe stop 20 and facilitates insertion of the pipe end 16a fully within the socket 14. The tapered portion 17a of the pipe end 16a is angled such that when the pipe section 16 is fully bottomed against the pipe stop 20, the pipe section 16 cannot move side to side (radially) in any direction.

In other embodiments, as illustrated in FIGS. 34-37, material is removed from the pipe end 16a to create a profiled pipe end 17' and pipe-stop 20 are, thus, continuous and uninterrupted around the entire circumference thereof (i.e., any out-of-roundness is removed and a slight interference fit is maintained between the pipe outer diameter Dp and the pipe stop inner diameter Ds. This provides a "snap-fit" between the pipe and the pipe stop, which creates a positive seal of plastic to plastic to prevent leakage of the bonding agent during injection of the bonding agent. Removal of material to create the pipe profiled end may extend to a distance slightly greater than the depth of the fitting socket to ensure removal of any out of roundness and so that a uniform gap exists between an outer surface of the pipe section and an inner surface of the socket.

A pair of ports 22 (only one illustrated in FIGS. 18-19) extend through the tubular member 12 in circumferentially spaced-apart relationship and are in fluid communication with the gap G. The ports 22 may be diametrically opposed, as illustrated in FIGS. 2-3, although other orientations are possible. A bonding agent is injected into the gap G via one of these ports 22, as illustrated in FIG. 19 and as described below.

The illustrated pipe fitting 300 also includes a removable and reusable clamp 50' that secures the pipe section 16 within the socket 14 as a bonding agent is injected into the gap G via one of the ports 22. The illustrated clamp 50' includes a pair of arcuate segments 52', each defining an arc of about 180°. However, embodiments of the present invention are not limited to two arcuate segments 52'. The clamp 50' may have various numbers of arcuate segments and is not limited to only two.

In the illustrated embodiment, each arcuate segment 52' has opposite first and second end portions 52'a, 52'b, an inner circumferential wall 53a, and an opposite outer circumferential wall 53b.

Each arcuate segment 52' also includes a sealing member 64 attached thereto, for example, in some embodiments removably secured thereto. In the illustrated embodiment, each arcuate segment 52' includes a slot 63 formed therein. The sealing member 64 is an elastomeric material, such as rubber, and has a bar-bell or dog-bone shaped cross-sectional configuration and is configured to slide into the slot 63. This allows the sealing member 64 to be replaced if damaged and/or for cleaning purposes.

As described above with respect to the embodiment illustrated in FIG. 9, each sealing member 64 has a length that is greater than a length of the respective arcuate segment 52' to which the sealing member 64 is attached. For example, in some embodiments, the length of each sealing member 64 may be at least about 0.010 inch longer than the length of the arcuate segment 52', although other lengths are possible. This extra length ensures that the ends of each sealing member 64 touch the ends of adjacent sealing members 64, thereby forming an annular seal that surrounds the pipe section 16. This annular seal prevents leakage of the bonding agent during the injection process.

The two arcuate segments 52' are joined together via a hinge 54 at the respective first end portions 52'a. The hinge 54 facilitates movement of the arcuate segments 52' relative to each other to facilitate installation of the clamp 50' around a pipe fitting 12 and pipe section 16, and to facilitate subsequent removal therefrom. In the illustrated embodiment, the hinge 54 is secured to the arcuate segments 52' via threaded fasteners 55 which are threadingly secured thereto via threaded openings 81 in the arcuate segments 52'. However, there are various ways of connecting the two arcuate segments 52', and embodiments of the present invention are not limited to the illustrated hinge configuration.

The arcuate segments 52' are removably fastened together at the respective second ends 52'b thereof by a fastener 120 (FIGS. 20-23). The fastener 120 is configured to draw the second ends 52'b of the arcuate segments 52' toward each other such that the sealing members 64 are compressed into sealing engagement with the socket 14 and the outer surface 16b of the pipe section 16. The illustrated fastener 120 includes a threaded rod 122 pivotably secured via pin P to a support bracket 124 extending radially outward from one of the arcuate segments 52' adjacent the second end 52'b thereof. The support bracket 124 may include a pair of adjacent, spaced-apart wall members 124w and the threaded rod 122 may be positioned between the pair of wall members 124w and pivotably secured thereto via pin P.

The illustrated fastener 120 includes a receiving member 126 that extends radially outward from the other one of the arcuate segments 52' adjacent the second end 52'b thereof and is configured to receive the threaded rod 122. The receiving member 126 comprises a pair of adjacent, spaced-apart wall members 126w defining a receiving slot 128 and the threaded rod 122 is configured to be removably received in the slot 128 between the wall members 126w. A threaded member or nut 129 is threadingly engaged with the threaded rod 122. To secure the clamp 50' around the pipe fitting, the nut 129 is threaded onto the threaded rod 122 such that the nut 129 pushes against end portions 126wa of the spaced-apart walls 126w. Continued rotation of the nut 129 causes the fastener 120 to draw the second ends 52'b of the arcuate segments 52' toward each other such that the sealing members 64 are compressed into sealing engagement with the socket 14 and the outer surface 16b of the pipe section 16. However, various ways of removably securing the two arcuate segments 52' together may be utilized and embodiments of the present invention are not limited to the illustrated fastener 120.

Figure 20:
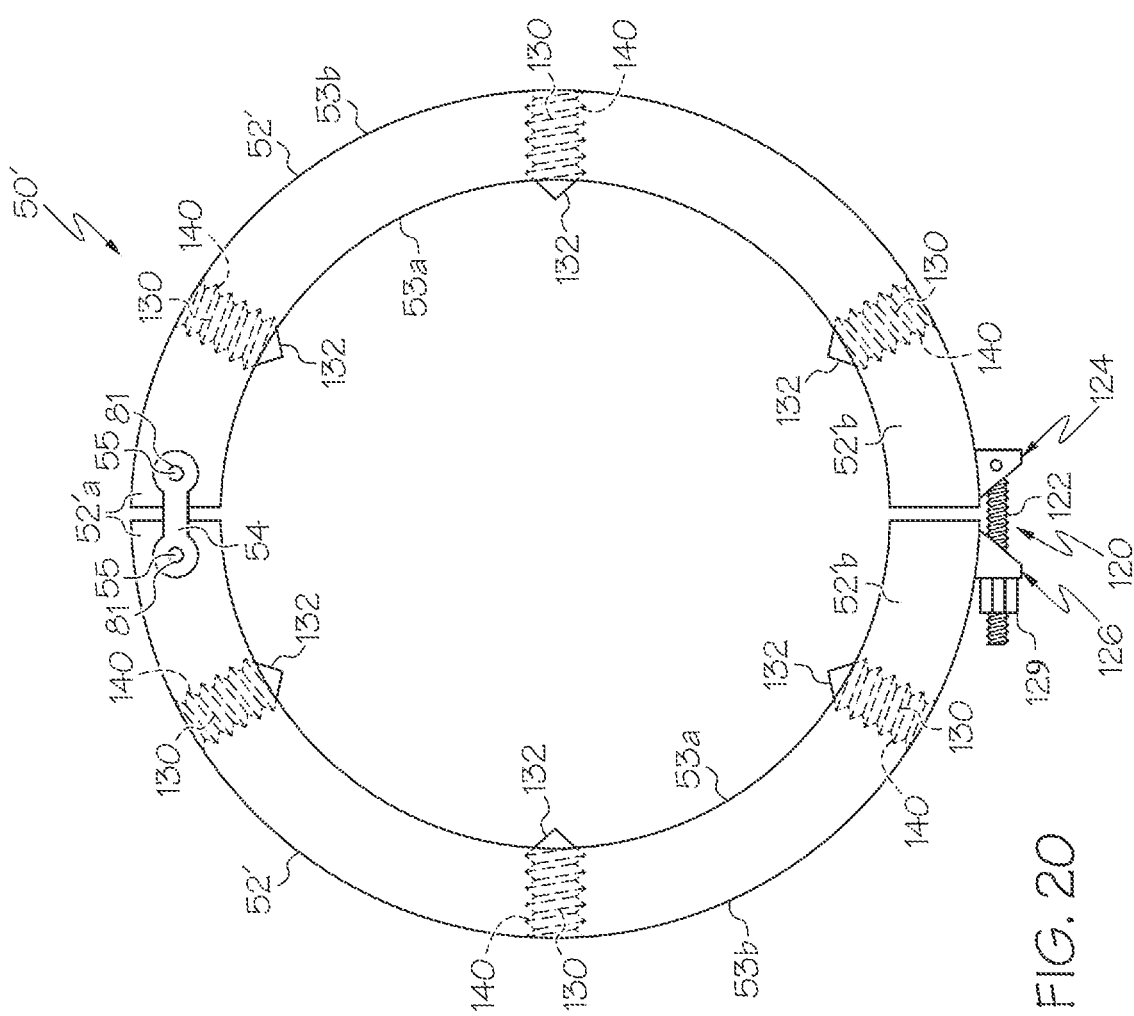
FIG. 20 is a top plan view of the clamp utilized in FIGS. 18 and 19.
Figure 21:
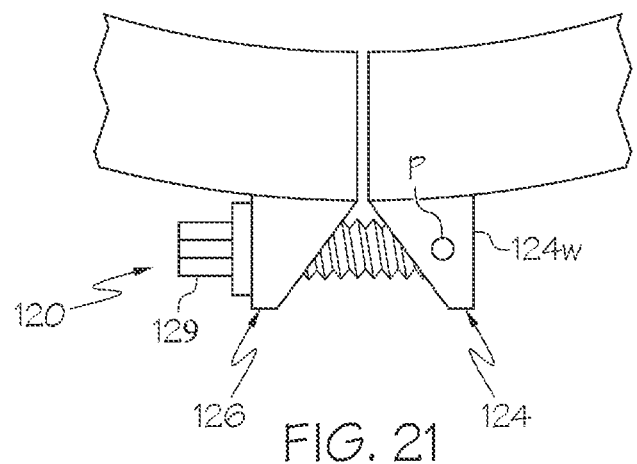
FIG. 21 is a partial view of the clamp of FIG. 20 illustrating the fastener in an engaged configuration.
Figure 22:
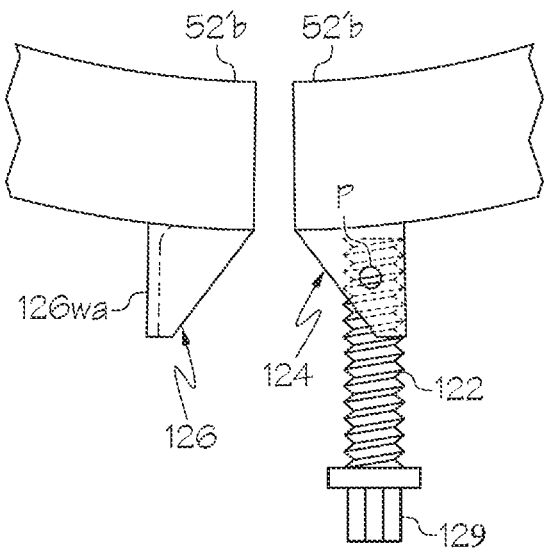
FIG. 22 is a partial view of the clamp of FIG. 20 illustrating the fastener in a disengaged configuration.
Figure 23:
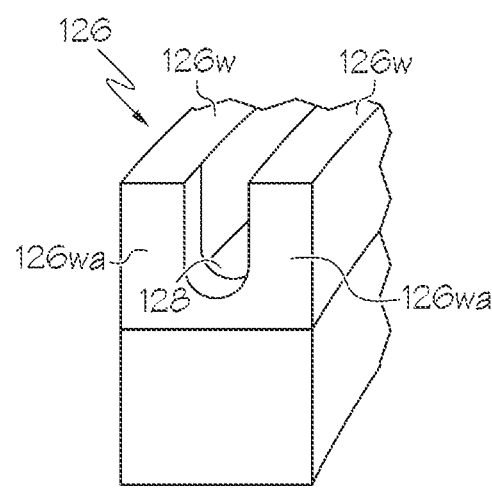
FIG. 23 is a partial perspective view of a portion of the fastener of FIGS. 21 and 22.

As illustrated in FIG. 20, the clamp 50' includes a plurality of circumferentially spaced-apart spring-loaded devices 130 positioned within each of the arcuate segments 52'. Each spring-loaded device 130 has a distal end portion or tip 132 that extends radially inward through the inner circumferential wall 53a and that is urged via a spring (134, FIG. 24) into contact with the outer surface 16b of the pipe section 16.

Figure 24:
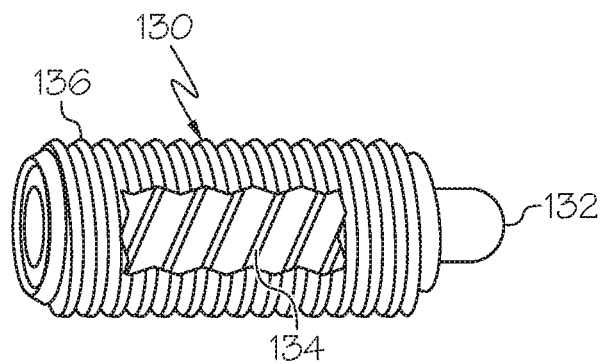
FIG. 24 is a perspective view of a spring-loaded device, according to some embodiments of the present invention.

Exemplary spring-loaded devices 120 that may be utilized with embodiments of the present invention are available from Vlier, 82 South Street, Hopkinton, Mass. As illustrated in FIG. 24, each spring-loaded device 130 includes a small internal compression spring 134 within a threaded body 136, and a movable tip 132 that is urged outwardly by the compression spring 134. Each arcuate segment 52' includes a plurality of circumferentially spaced apart bores 140 extending from the outer circumferential wall 53b to the inner circumferential wall 53a, and at least a portion of each bore 140 is threaded. The threaded body 136 of each spring-loaded device 130 is threadingly secured within a respective bore 140.

The tip 132 of each spring-loaded device 130 presses into the pipe material in multiple locations and, as the clamp 50' is tightened around the pipe 16 via the fastener 120, each tip 132 will retract into the threaded body 136 allowing the ramp 65w of the ring 50' to move down the fitting 300. As the tip 132 of each spring-loaded device 130 is pushed deeper into the threaded body 136, it does so with more compression on the spring 134. This in turn places more force in gripping and pushing the tip 132 deeper into the outer surface 16b of the pipe 16.

The plurality of spring loaded devices 130 serve to hold the pipe section 16 downward and tight against the socket bottom, keeping the pipe section 16 inserted past the pipe stop 20 and thus helping in creating a positive seal between the pipe edge and fitting pipe-stop at the bottom of the socket without the need for an additional secondary seal to prevent leakage of bonding agent during injection of the bonding agent (BA, FIG. 19).

In the illustrated embodiment, there are a total of six spring-loaded devices 130, three within each arcuate segment 52'. However, embodiments of the present invention are not limited to any particular number of spring-loaded devices 130. Various numbers of spring-loaded devices 130 may be utilized. Moreover, the number of spring-loaded devices 130 in the clamp 50' may vary with the type and hardness of the pipe material being joined. In some embodiments, multiple bores 140 may be formed within each arcuate segment 52' which allow a user to selectively secure spring-loaded devices 130 in some or all of the bores 140 depending on the type of material of the pipe being joined.

In addition, the spring-loaded devices 130 also help prevent the pipe section from being pulled out of the socket 14. The tips 132 of the spring-loaded devices 130 can have a configuration such that they become at least somewhat embedded into the outer surface 16a of the pipe section 16 to prevent pipe pull-out once from the socket 14. In addition to aligning the pipe section 16 in the center of the socket 14 and preventing pipe pull-out, the tips 132 of the spring-loaded devices 130 may also provide some resistance to pipe rotation within the socket 14.

Figure 25:
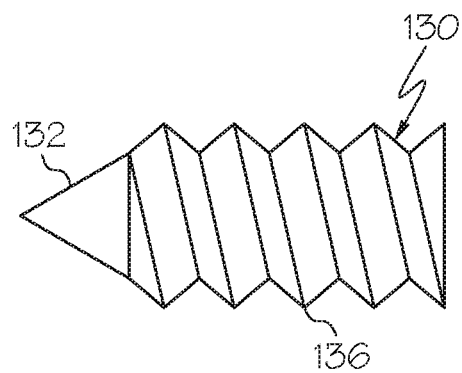
FIGS. 25-27 illustrate different configurations of the distal end portion of the spring-loaded devices in the clamp of FIGS. 18 and 19, according to some embodiments of the present invention.
Figure 26:
Figure 27:

FIGS. 25-27 illustrate various shapes that a tip 132 of a spring-loaded device 130 can have according to some embodiments of the present invention. The tip 132 illustrated in FIG. 25 has a pointed, conical configuration. The tip 132 illustrated in FIG. 26 has a conical configuration, but is less pointed that the tip 132 of FIG. 25. The tip 132 illustrated in FIG. 27 has a rounded configuration.

Referring back to FIGS. 18-19, the lower portion 52d of each arcuate segment 52' includes an arcuate channel 65. The arcuate channel 65 includes a sloped inner wall 65w, as illustrated. The tubular member 12 includes an annular flange 12f having a sloped outer wall 12w. When the clamp 50' is installed around the pipe section 16 and tubular fitting 14, the arcuate groove 65 receives the tubular member annular flange 12f therein. The sloped inner wall 65w of the groove 65 engages the annular flange sloped outer wall 12w. This configuration allows each arcuate segment 52' to move radially inwardly and compress the respective sealing members 64 into sealing engagement with the tubular member 12 and pipe section 16 to seal an open end of the gap G as the fastener 120 is engaged and tightened. The sloped inner wall 65w of each groove 65 slides along the annular flange sloped outer wall 12w as the fastener 120 is engaged and tightened, causing the arcuate segments 52' to move radially inward.

Radially inward movement of the arcuate segments 52' causes the sealing members 64 to compress into sealing engagement with the tubular member 12 and pipe section 16 to seal an open end of the gap G. The pipe fitting 300 is then ready to receive a bonding agent BA in the gap G, as illustrated in FIG. 19. Typically, only one of the ports 22 is used for injecting the bonding agent into the gap G that is formed between the outer surface 16a of the pipe section 16 and the inner surface 14a of the socket 14, and the other port 22 is used as a vent to allow air to escape as it is pushed out by the bonding agent, and to identify when the gap is full of bonding agent, as described above.

When a bonding agent is injected into the gap G via a port 22, the sealing members 64 prevent the bonding agent from leaking out of the open end of the socket. Once the bonding agent is injected, the clamp 50' can be removed and can be reused. The clamp 50' may be removed before or after the bonding agent cures.

Figure 32:
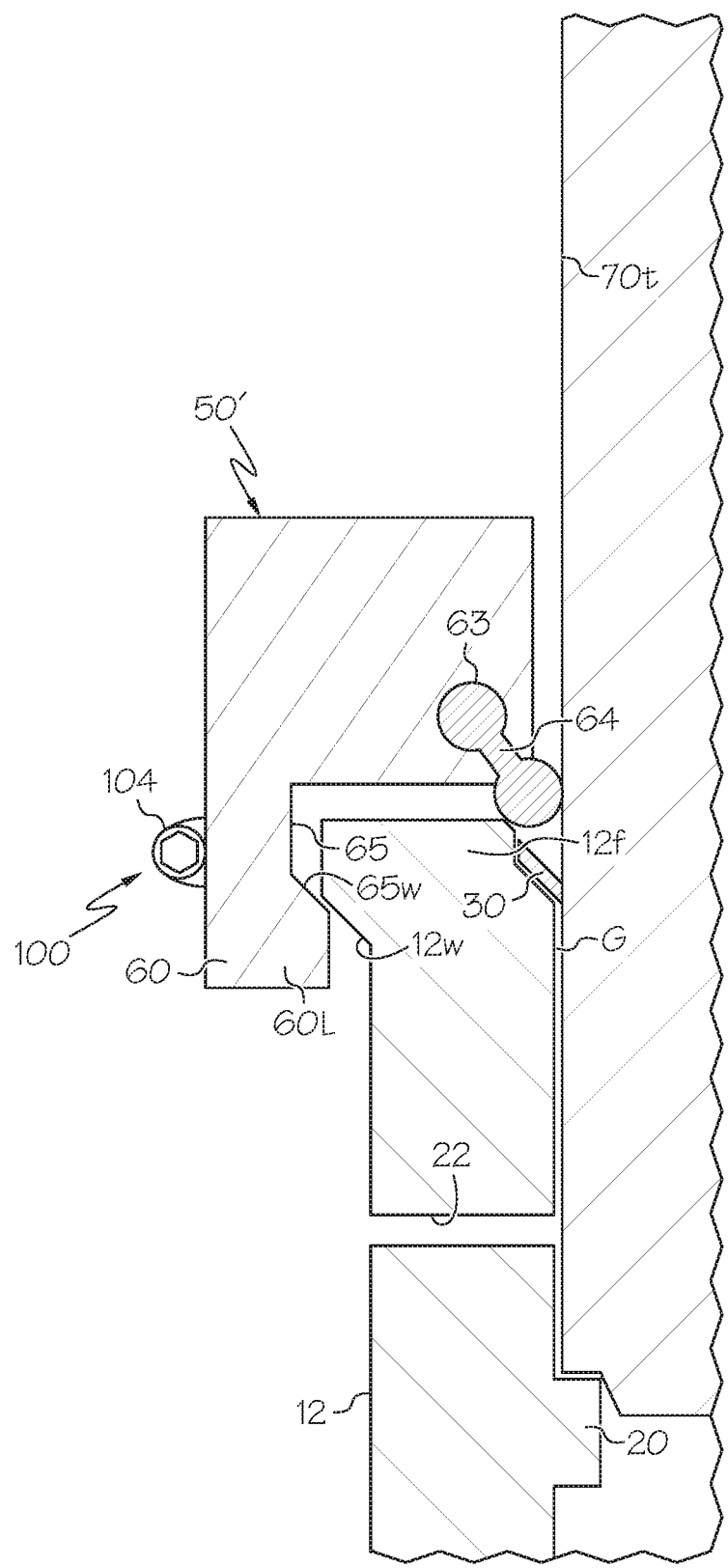
FIGS. 32 and 33 are partial views of the pipe fitting of FIG. 28 and illustrate relative movement between an arcuate segment of the removable clamp and the socket as the clamp is tightened.
Figure 33:
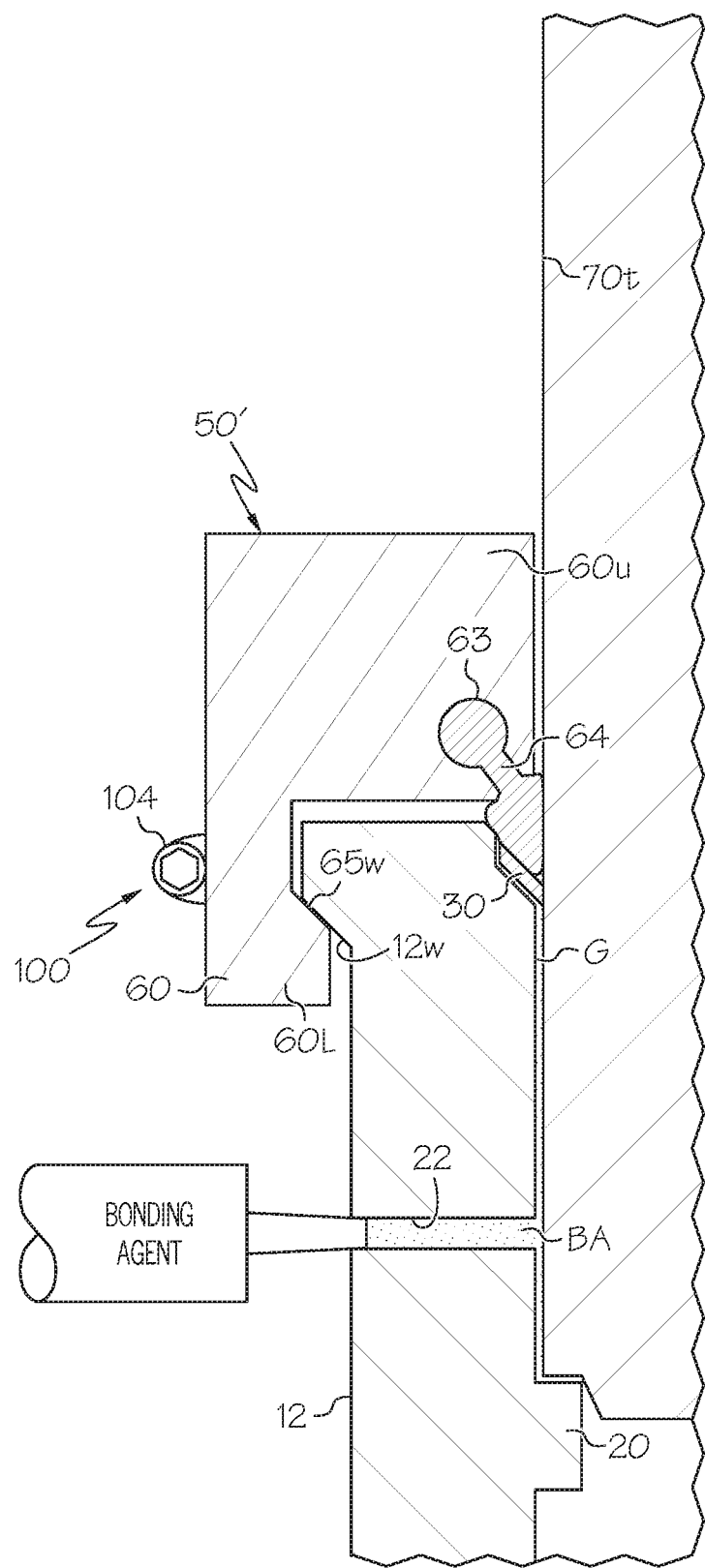

Referring to FIGS. 28 and 32-33, the clamp 50' of FIG. 20 may be utilized with a pipe fitting 300 that includes a grab ring 30, as described above with respect to FIGS. 4-6. As illustrated in FIG. 28, the pipe fitting 300 includes a tubular member 12 having a socket 14, a grab ring 30 within the socket 14, and the removable clamp 50' of FIG. 20. A portion of a male end of a pipe section 16 is inserted into the socket 14 and is being held in place via the clamp 50' so that a bonding agent BA can be injected into a gap G between the pipe section 16 and the socket 14 to join the pipe section 16 to the pipe fitting 300. The grab ring 30 may help maintain a coaxial relationship between the pipe section 16 and the socket 14 such that a circumferentially uniform gap G is maintained therebetween.

FIGS. 32 and 33 illustrate relative movement between the removable clamp 50' and the socket 14 of the fitting 300 of FIG. 28 as the clamp 50' is tightened (only one arcuate segment 52' is illustrated in FIGS. 32-33 for clarity). As illustrated in FIG. 32, the clamp 50' is installed on the pipe section 16 and tubular member 12. As the fastener 120 (FIGS. 20-23) of the clamp 50' is operated to cause the second ends 52'b of the arcuate segments 52' together, as described above, the sloped wall 65w of each groove 65 slides along the annular flange sloped outer wall 12w. As such, the sealing members 64 are compressed into sealing engagement with the tubular member 12 and pipe section 16 to seal an open end of the gap G, as illustrated in FIG. 33. The pipe fitting 300 is ready to receive a bonding agent BA in the gap G, as illustrated in FIG. 33.

Figure 30:
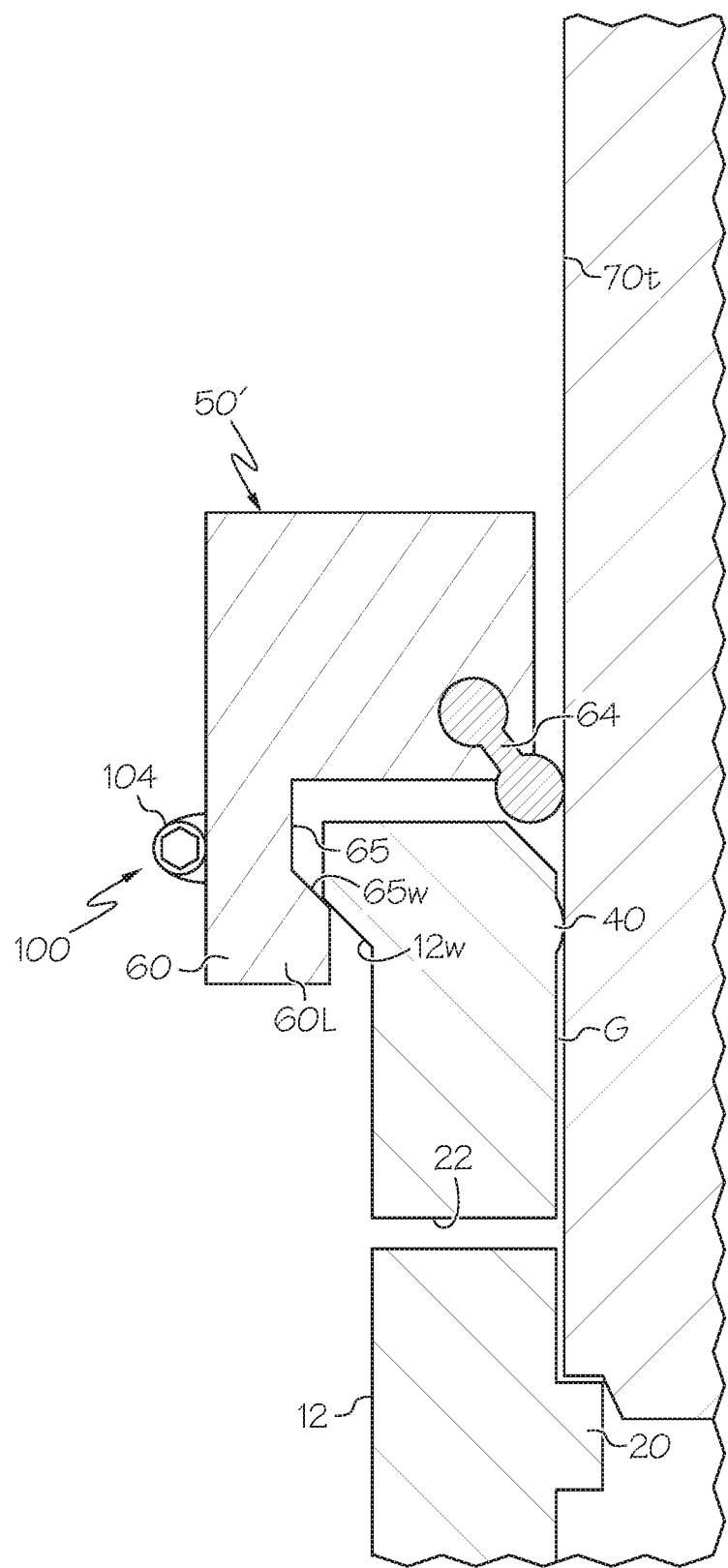
FIGS. 30 and 31 are partial views of the pipe fitting of FIG. 29 and illustrate relative movement between an arcuate segment of the removable clamp and the socket as the clamp is tightened.
Figure 31:
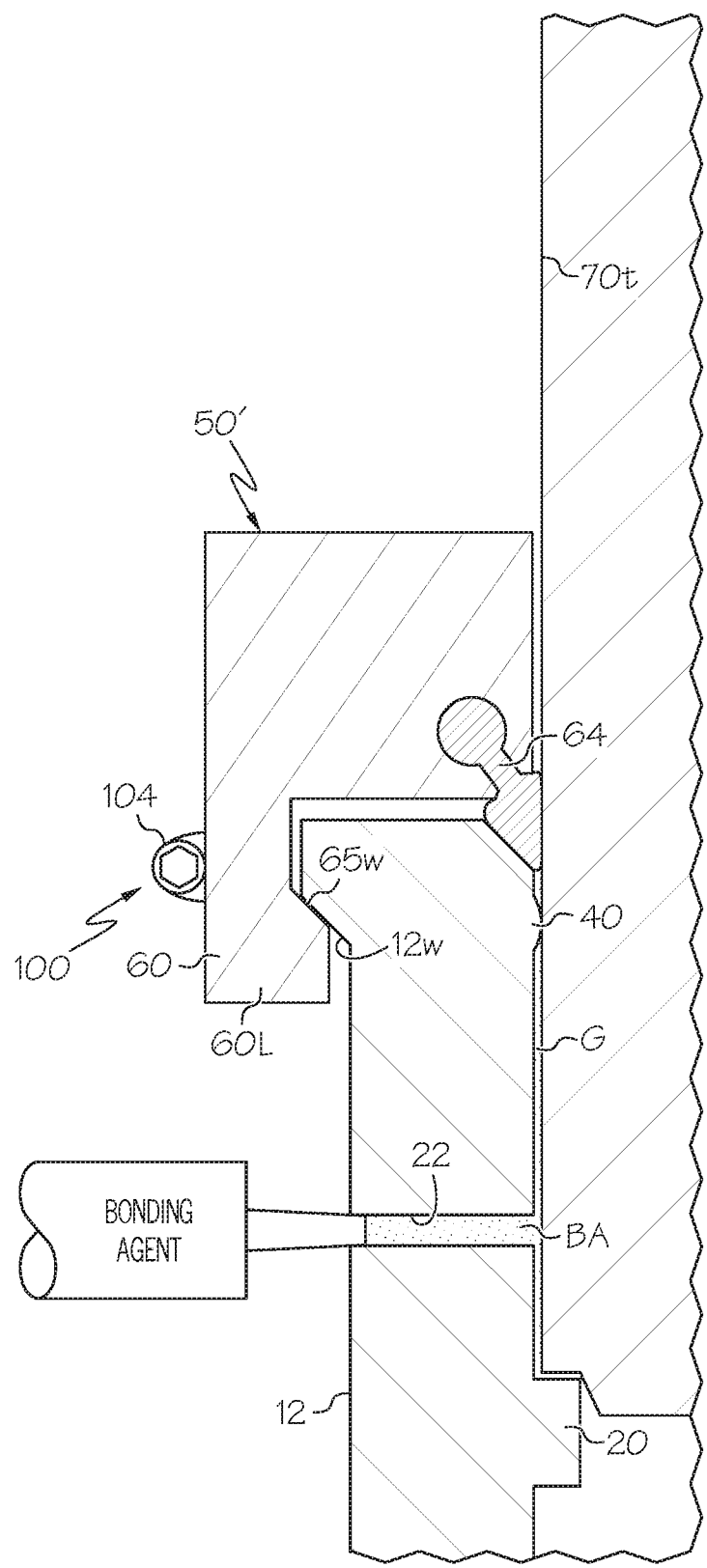

Referring to FIGS. 29 and 30-31, the clamp 50' of FIG. 20 may be utilized with a pipe fitting 300 that includes circumferentially spaced-apart raised members 40 extending outwardly from the inner surface 14a of the socket 14, as described above with respect to FIG. 3. As illustrated in FIG. 29, a portion of a male end of a pipe section 16 is inserted into the socket 14 and is being held in place via the clamp 50' so that a bonding agent BA can be injected into a gap G between the pipe section 16 and the socket 14 to join the pipe section 16 to the pipe fitting 300. The raised members 40 may help maintain a coaxial relationship between the pipe section 16 and the socket 14 such that a circumferentially uniform gap G is maintained therebetween.

FIGS. 30 and 31 illustrate relative movement between the removable clamp 50' and the socket 14 of the fitting 300 of FIG. 29 as the clamp 50' is tightened (only one arcuate segment 52' is illustrated in FIGS. 30-31 for clarity). As illustrated in FIG. 30, the clamp 50' is installed on the pipe section 16 and tubular member 12. As the fastener 120 (FIGS. 20-23) of the clamp 50' is operated to cause the second ends 52'*b* of the arcuate segments 52' together, as described above, the sloped wall 65*w* of each groove 65 slides along the annular flange sloped outer wall 12*w*. As such, the sealing members 64 are compressed into sealing engagement with the tubular member 12 and pipe section 16 to seal an open end of the gap G, as illustrated in FIG. 31. The pipe fitting 300 is ready to receive a bonding agent BA in the gap G, as illustrated in FIG. 31.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A clamp that facilitates securing a pipe section within a socket, the clamp comprising:
   a pair of arcuate segments, each arcuate segment comprising:
   an inner circumferential wall;
   opposite first and second end portions;
   an elongated sealing member extending outwardly from the inner circumferential wall along an entire length of the inner circumferential wall; and
   a plurality of circumferentially spaced-apart spring-loaded devices, each spring-loaded device having a distal end portion extending through the inner circumferential wall that is configured to be urged into contact with an outer surface of the pipe section;
   wherein the arcuate segments are hinged together at the respective first ends thereof; and
   wherein the arcuate segments are removably fastened together at the respective second ends thereof by a fastener, wherein the fastener is configured to draw the second ends of the arcuate segments toward each other such that the sealing members are compressed into sealing engagement with the socket and the outer surface of the pipe section.

2. The clamp of claim 1, wherein a length of each sealing member is greater than a length of the inner circumferential wall of a respective arcuate segment.

3. The clamp of claim 1, wherein each sealing member is removably secured to a respective arcuate segment.

4. The clamp of claim 1, wherein each arcuate segment comprises a plurality of circumferentially spaced apart bores extending from an outer circumferential wall to the inner circumferential wall, wherein at least a portion of each bore is threaded, and wherein each spring-loaded device comprises a threaded body that is threadingly secured within a respective bore.

5. The clamp of claim 4, wherein each spring-loaded device comprises a spring within the threaded body that urges the distal end portion into contact with the outer surface of the pipe section.

6. The clamp of claim 1, wherein the socket comprises an annular flange having a sloped outer wall, and wherein each arcuate segment comprises an arcuate groove configured to receive a portion of the socket annular flange.

7. The clamp of claim 6, wherein the arcuate groove comprises a sloped inner wall that engages the annular flange sloped outer wall, and wherein the sloped inner walls of the arcuate segments and the annular flange sloped outer wall move relative to each other as the second ends of the arcuate segments are drawn together by the fastener.

8. A pipe connector kit, comprising:
   a tubular member comprising a socket configured to receive an end of a pipe section therein such that a gap exists between an outer surface of the pipe section and an inner surface of the socket, wherein a pair of ports extend through the tubular member in circumferentially spaced-apart relationship and are in fluid communication with the gap; and
   a clamp that secures the pipe section within the socket as a bonding agent is extruded into the gap via one of the ports, wherein the clamp comprises:
   a pair of arcuate segments, each arcuate segment comprising:
   an inner circumferential wall;
   opposite first and second end portions;
   an elongated sealing member extending outwardly from the inner circumferential wall along an entire length of the inner circumferential wall; and
   a plurality of circumferentially spaced-apart spring-loaded devices, each spring-loaded device having a distal end portion extending through the inner circumferential wall that is configured to be urged into contact with an outer surface of the pipe section;
   wherein the arcuate segments are hinged together at the respective first ends thereof; and
   wherein the arcuate segments are removably fastened together at the respective second ends thereof by a fastener, wherein the fastener is configured to draw the second ends of the arcuate segments toward each other such that the sealing members are compressed into sealing engagement with the socket and the outer surface of the pipe section.

9. The pipe connector kit of claim 8, further comprising a container of bonding agent, wherein the container is configured to inject the bonding agent into the gap via one of the ports.

10. The pipe connector kit of claim 8, wherein the tubular member comprises an annular flange having a sloped outer wall, and wherein each arcuate segment comprises an arcuate groove configured to receive a portion of the socket annular flange.

11. The pipe connector kit of claim 10, wherein the arcuate groove comprises a sloped inner wall that engages the annular flange sloped outer wall, and wherein the sloped inner walls of the arcuate segments and the annular flange sloped outer wall move relative to each other as the second ends of the arcuate segments are drawn together by the fastener.

12. The pipe connector kit of claim 8, wherein a length of each sealing member is greater than a length of the inner circumferential wall of a respective arcuate segment.

13. The pipe connector kit of claim 8, wherein each sealing member is removably secured to a respective arcuate segment.

14. The pipe connector kit of claim 8, wherein each arcuate segment comprises a plurality of circumferentially spaced apart bores extending from an outer circumferential wall to the inner circumferential wall, wherein at least a portion of each bore is threaded, and wherein each spring-loaded device comprises a threaded body that is threadingly secured within a respective bore.

15. The pipe connector kit of claim 14, wherein each spring-loaded device comprises a spring within the threaded body that urges the distal end portion into contact with the outer surface of the pipe section.

16. The pipe connector kit of claim 8, further comprising a grab ring, wherein the grab ring comprises:

an annular member comprising opposite inner and outer peripheral edges;

a first plurality of inwardly projecting gripping teeth on the inner peripheral edge in circumferentially spaced-apart relationship; and a second plurality of outwardly projecting gripping teeth on the outer peripheral edge in circumferentially spaced-apart relationship.

17. The pipe connector kit of claim 8, further comprising a plurality of raised members extending outwardly from the inner surface of the socket in circumferentially spaced-apart relationship.

18. A method of forming a pipe joint between a pipe section and a pipe fitting, wherein the pipe fitting includes a socket configured to receive an end of the pipe section, the method comprising:

inserting the end of the pipe section into the socket;

attaching a clamp to the pipe section and pipe fitting, wherein the clamp includes a pair of arcuate segments, each arcuate segment having an inner circumferential wall, opposite first and second end portions, an elongated sealing member extending outwardly from the inner circumferential wall along an entire length of the inner circumferential wall, and a plurality of circumferentially spaced-apart spring-loaded devices, each spring-loaded device having a distal end portion extending through the inner circumferential wall that is configured to be urged into contact with an outer surface of the pipe section, wherein the arcuate segments are hinged together at the respective first ends thereof;

drawing the respective second ends of the arcuate segments together via a fastener such that the sealing members are compressed into sealing engagement with the socket and the outer surface of the pipe section; and injecting a bonding agent into the gap via a port that extends through the pipe fitting.

19. The method of claim 18, wherein the socket comprises an annular pipe stop extending from the inner surface thereof that is configured to receive the end of the pipe section, and wherein the method comprises, prior to inserting the end of the pipe section into the socket, removing material from the pipe end to create a profiled end that matingly engages with the pipe stop, and wherein inserting the end of the pipe section into the socket comprises engaging the profiled end of the pipe section with the pipe stop.

* * * * *